INVENTORS
RAYMOND A. CHRISTIAN
JAMES H. CRAWFORD
JESSE R. GANGER &
ELMER J. STOCKLER

BY Carl Beust
Richard Van Busum

THEIR ATTORNEYS

INVENTORS
RAYMOND A. CHRISTIAN
JAMES H. CRAWFORD
JESSE R. GANGER &
ELMER J. STOCKLER
BY Carl Beust
Richard Van Buren
THEIR ATTORNEYS INVENTORS
RAYMOND A. CHRISTIAN
JAMES H. CRAWFORD
JESSE R. GANGER &
ELMER J. STOCKLER
BY Carl Beust
Richard Van Buren
THEIR ATTORNEYS INVENTORS
RAYMOND A. CHRISTIAN
JAMES H. CRAWFORD
JESSE R. GANGER &
ELMER J. STOCKLER
BY Carl Beust
Richard Van Buren
THEIR ATTORNEYS INVENTORS
RAYMOND A. CHRISTIAN
JAMES H. CRAWFORD
JESSE R. GANGER &
ELMER J. STOCKLER BY Carl Beust
Richard Van Blusum

THEIR ATTORNEYS

INVENTORS
RAYMOND A. CHRISTIAN
JAMES H. CRAWFORD
JESSE R. GANGER &
ELMER J. STOCKLER

BY Carl Beust
Richard Van Buren

THEIR ATTORNEYS

INVENTORS
RAYMOND A. CHRISTIAN
JAMES H. CRAWFORD
JESSE R. GANGER &
ELMER J. STOCKLER
BY Carl Beust
Richard Van Busum
THEIR ATTORNEYS INVENTORS
RAYMOND A. CHRISTIAN
JAMES H. CRAWFORD
JESSE R. GANGER &
ELMER J. STOCKLER
BY Carl Beust
Richard Van Busum
THEIR ATTORNEYS INVENTORS
RAYMOND A. CHRISTIAN
JAMES H. CRAWFORD
JESSE R. GANGER &
ELMER J. STOCKLER
BY Carl Beust
Richard Van Busum
THEIR ATTORNEYS INVENTORS
RAYMOND A. CHRISTIAN
JAMES H. CRAWFORD
JESSE R. GANGER &
ELMER J. STOCKLER
BY Carl Beust
Richard Van Busum
THEIR ATTORNEYS

| | A | B | C | D | E | F | G | H |
|---|---|---|---|---|---|---|---|---|
| 0 | | | | | I | II | | |
| 1 | | II | | | | | I | |
| 2 | | | | II | | | I | |
| 3 | I | II | | | | | | |
| 4 | | | | | | II | I | |
| 5 | | II | I | | | | | |
| 6 | I | | | | | II | | |
| 7 | | | | | | | I | II |
| 8 | | II | | | I | | | |
| 9 | I | | | | | | | II |

INVENTORS
RAYMOND A. CHRISTIAN
JAMES H. CRAWFORD
JESSE R. GANGER &
ELMER J. STOCKLER
BY Carl Beust
Richard Van Busum
THEIR ATTORNEYS United States Patent Office 2,931,564

Patented Apr. 5, 1960

2,931,564

DIGITAL SWITCH MECHANISM FOR COMBINED ACCOUNTING MACHINE AND TAPE RECORDER

Raymond A. Christian, James H. Crawford, Jesse R. Ganger, and Elmer J. Stockler, Dayton, Ohio, assignors to The National Cash Register Company, Dayton, Ohio, a corporation of Maryland Application February 23, 1956, Serial No. 567,312

7 Claims. (Cl. 235—60.13)

The present invention relates to accounting and analogous machines, and is particularly directed to switch operating and controlling mechanisms for causing data set up on or contained in the accounting machine to be transferred to tape, which may be used, for example, as an input medium for electronic or mechanical computers.

It is generally an object of the present invention to provide a known type of accounting machine, with mechanism to control the operation of a tape recording device to record data relating to computations carried on in said accounting machine, on a web of tape carried by said device.

Another object is the provision of a known type of accounting machine with a switch mechanism to control the operation of an electrical tape recording device to record data relating to computations carried on in said accounting machine, on a web of tape carried by said device.

A further object of the present invention is to provide a known type of accounting machine having data keys and differential actuators controlled by said data keys, with a switch mechanism controlled by said differential actuators for electrically controlling the operation of a tape recording device to record the data set up on said data keys on a web of tape carried by said device.

A still further object is to provide a known type of accounting machine, having totalizers, data keys, and differential actuators positionable under control of the data keys in certain operations to enter data set up on said keys in the totalizers, said actuators also positionable under control of the totalizers in certain other operations, with a switch mechanism controlled by said actuators for governing the operation of a tape recording device to record data corresponding to the position of said actuators on a web of tape carried by said device.

With these and incidental objects in view, the invention includes certain novel features of construction and combinations of parts, a preferred form or embodiment of which is hereinafter described with reference to the drawings which accompany and form a part of this specification.

Figure 8A:
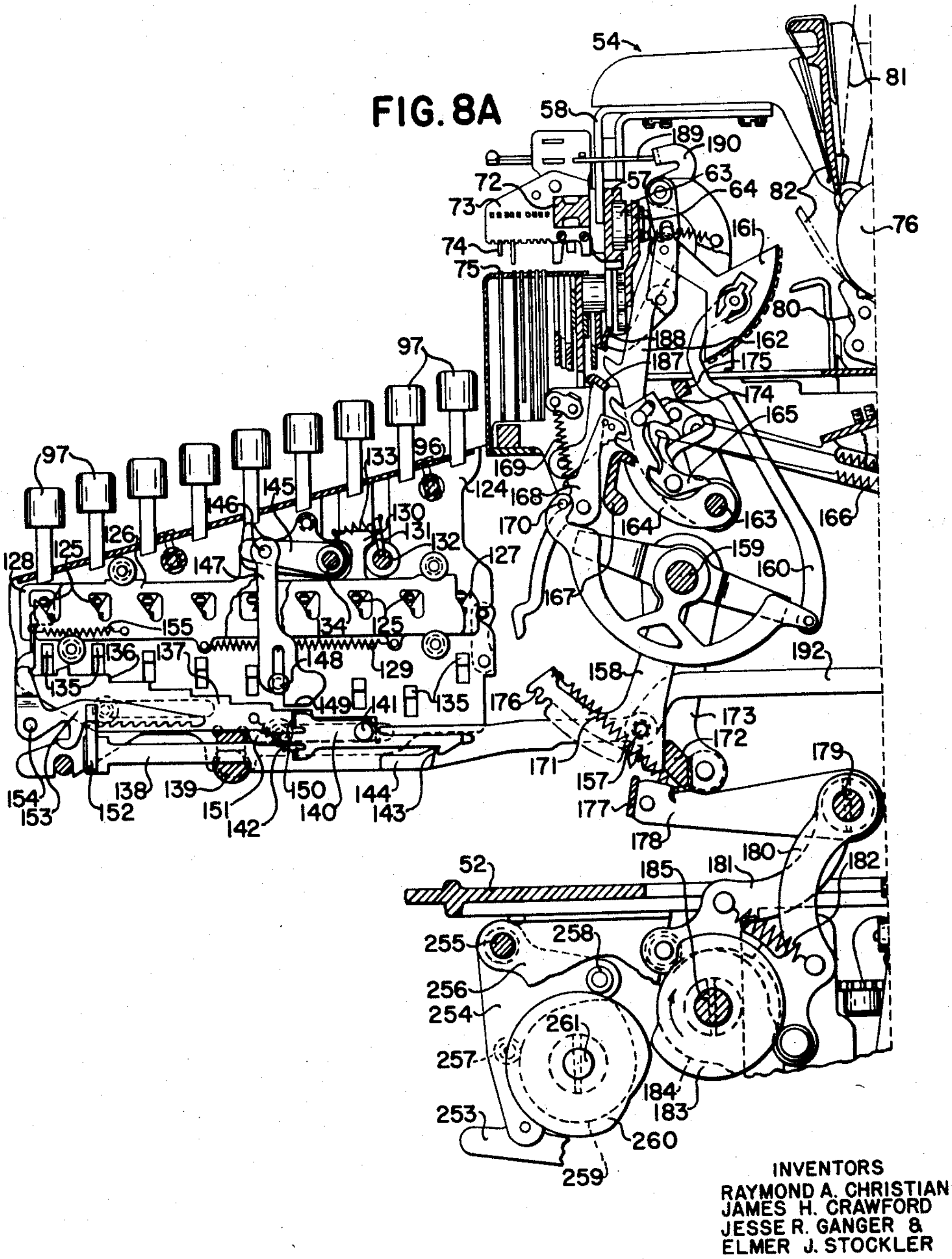
Figure 8B:
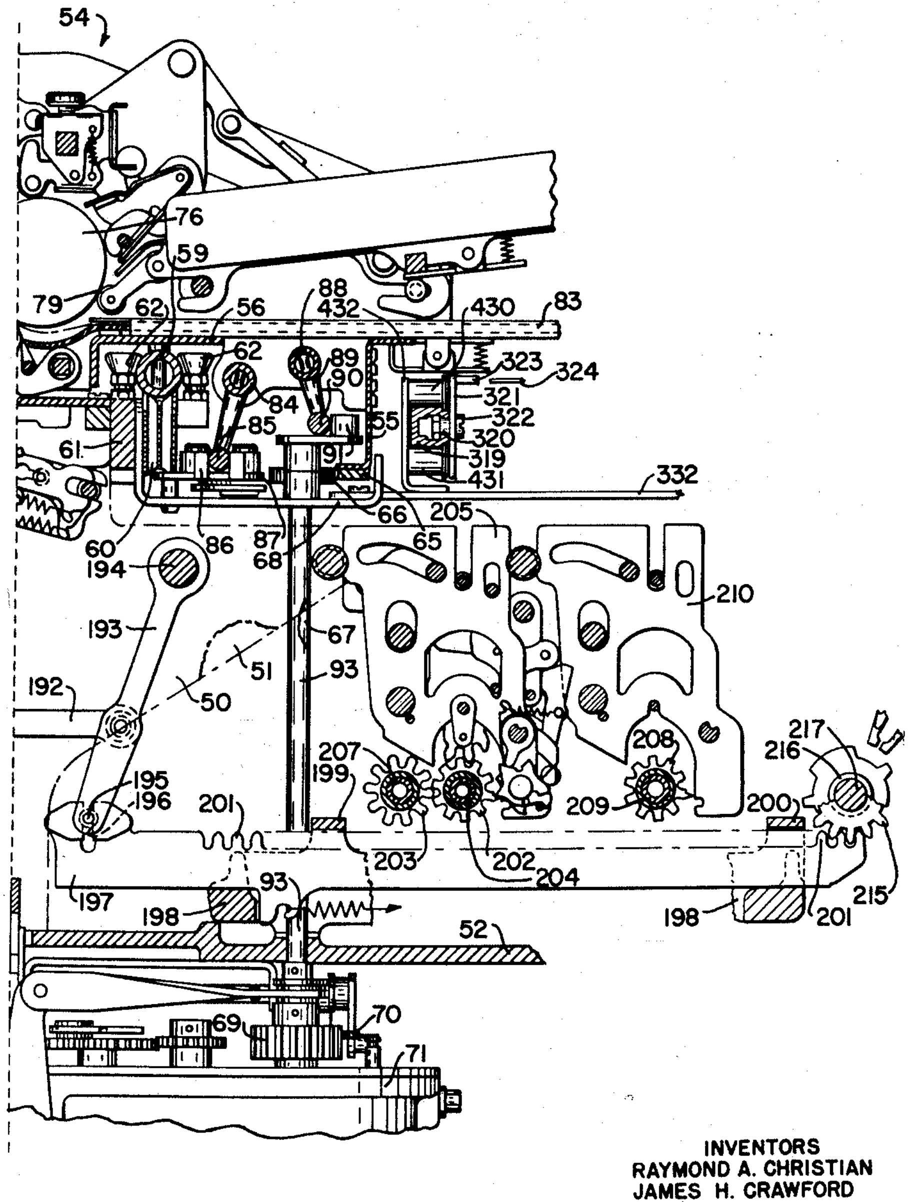

Figs. 8A and 8B together constitute a cross-sectional view of the entire machine, taken generally just to the right of one of the amount banks.

Figures 9, 10:
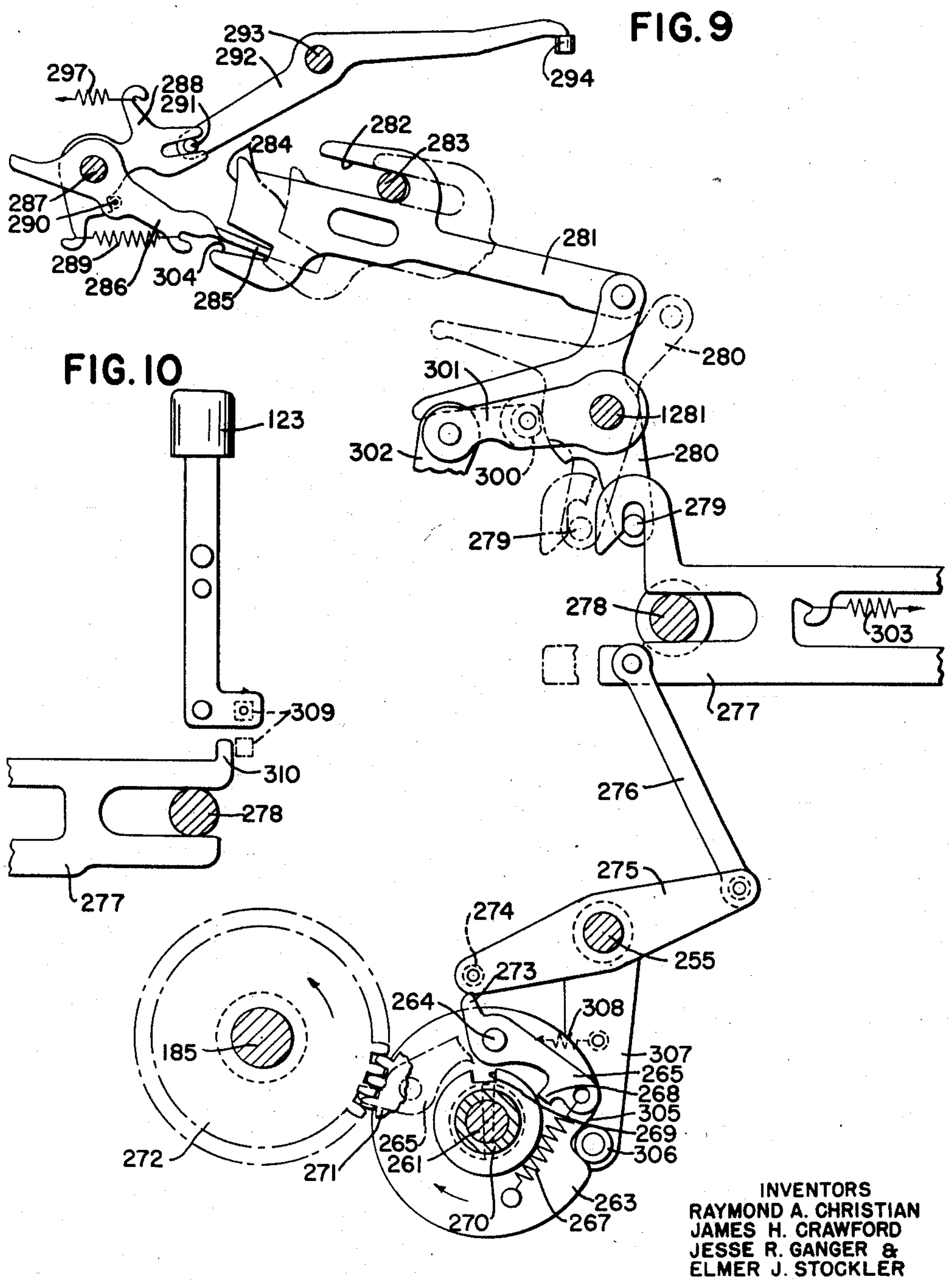

Fig. 9 is a right side elevation of the carriage controlled mechanism for selectively controlling the operation of the recording unit.

Fig. 10 is a detail view of the Void key for controlling void operations in the recording unit.

Figure 11:
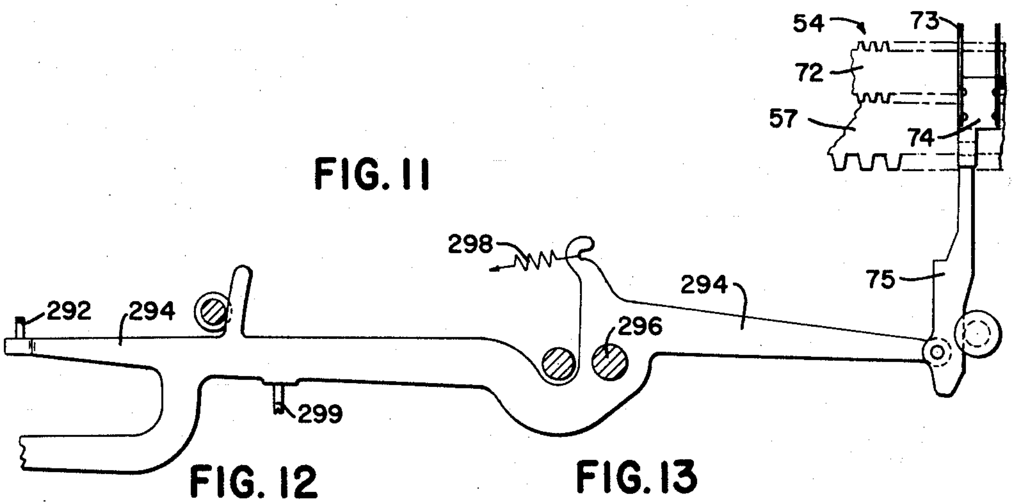

Fig. 11 is a front detail view of the selecting lever and associated mechanism, shown in Fig. 9 for controlling operation of the recording unit.

Figures 12, 13:
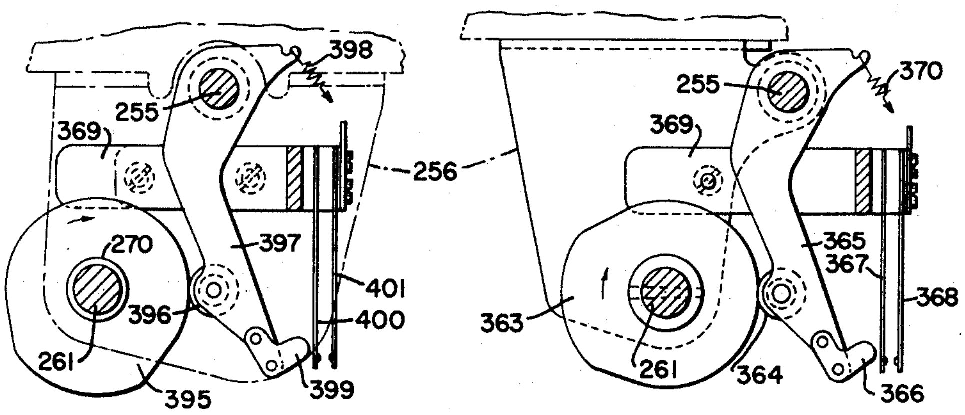

Figs. 12 and 13 are detail views, as observed from the right, of switches and their operating cams for controlling the operation of the recording unit.

Figure 14:
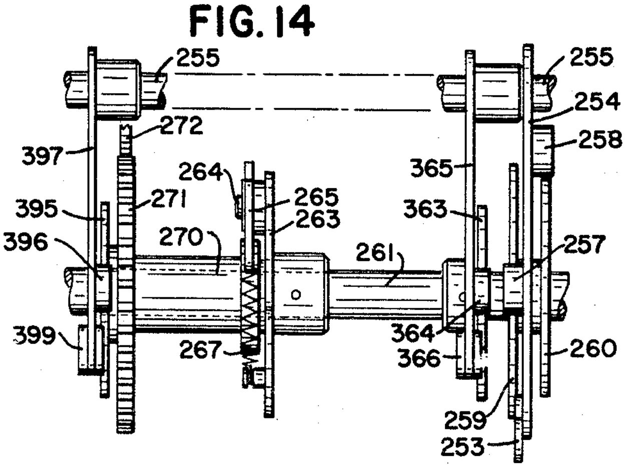

Fig. 14 is a front side-spacing view of the mechanism shown in Figs. 12 and 13, and other mechanism associated therewith.

Figures 15, 16, 17, 18:
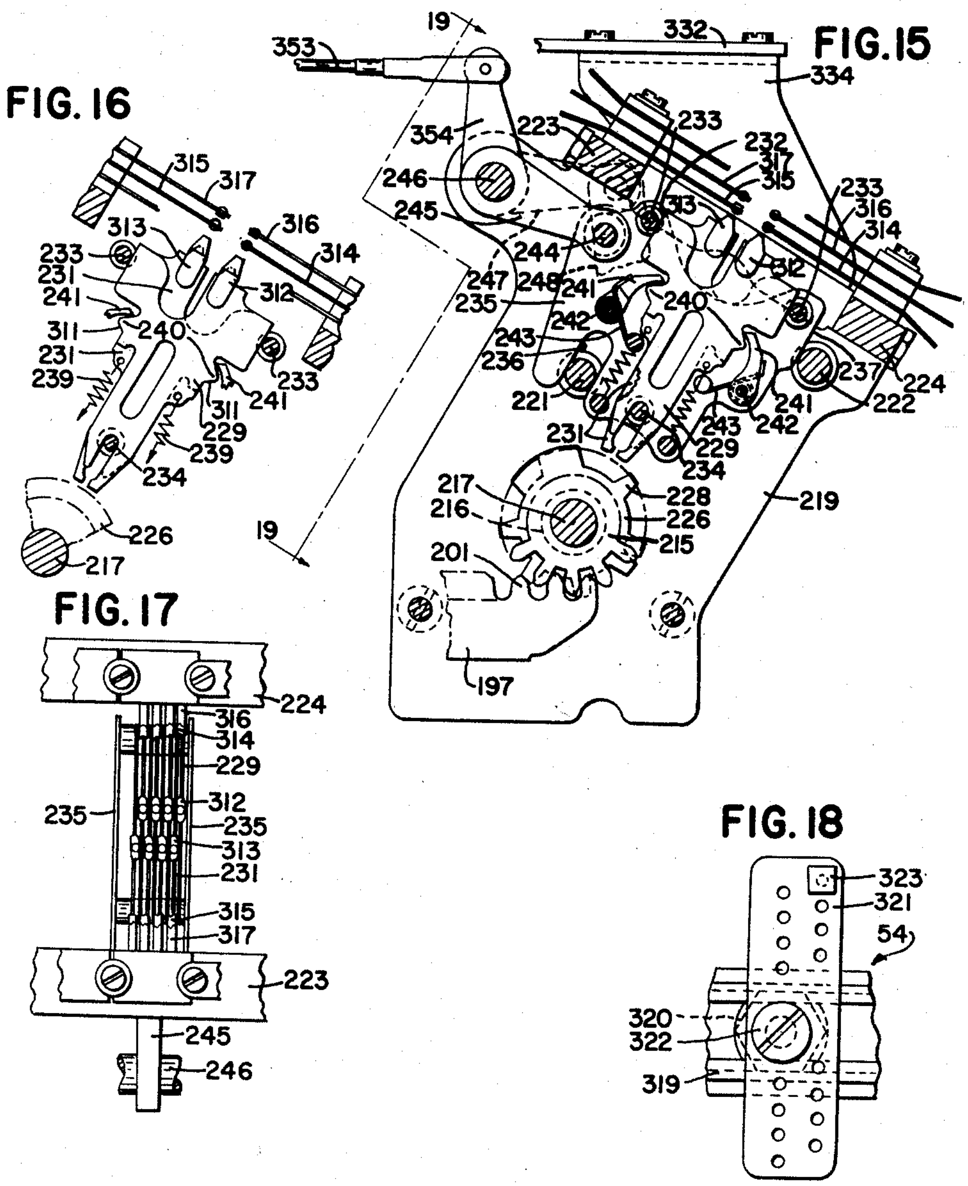

Fig. 15 is a cross-section view, as observed from the right side of the machine, showing one denominational order of control switches for the recording unit.

Fig. 16 is a detail view of one set of switch operating plungers and associated mechanism.

Fig. 17 is a fragmentary top plan view showing the eight switch operating plungers for one denominational order.

Fig. 18 is a detail view of a control plate adjustably mounted at the rear of the traveling carriage in preselected columnar positions for selectively controlling operation of the recording unit.

Figure 19:
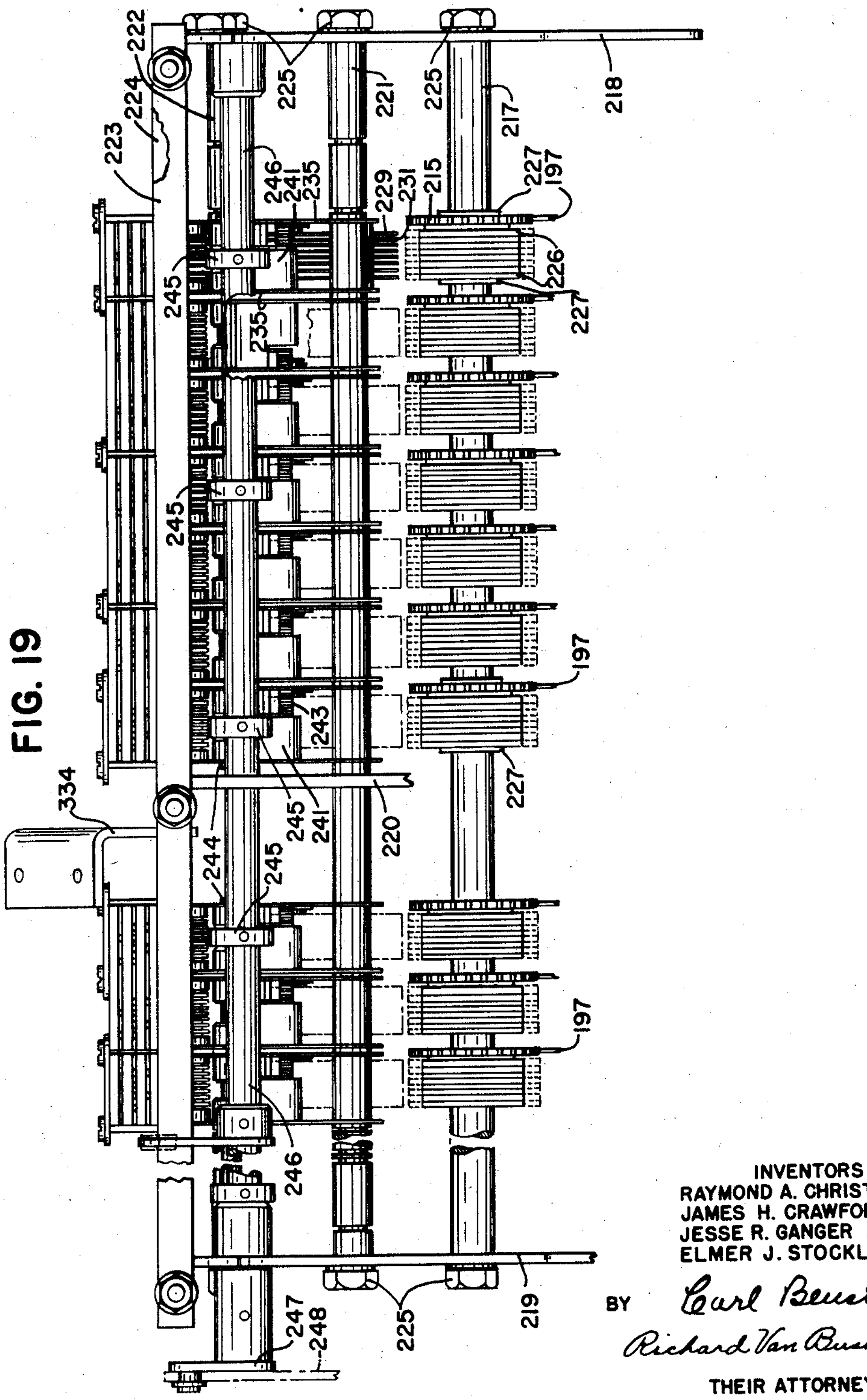

Fig. 19 is a front plan view of the recorder switch mechanism, as observed in the direction indicated by arrows 19—19 in Fig. 15.

Figures 20, 21, 22:
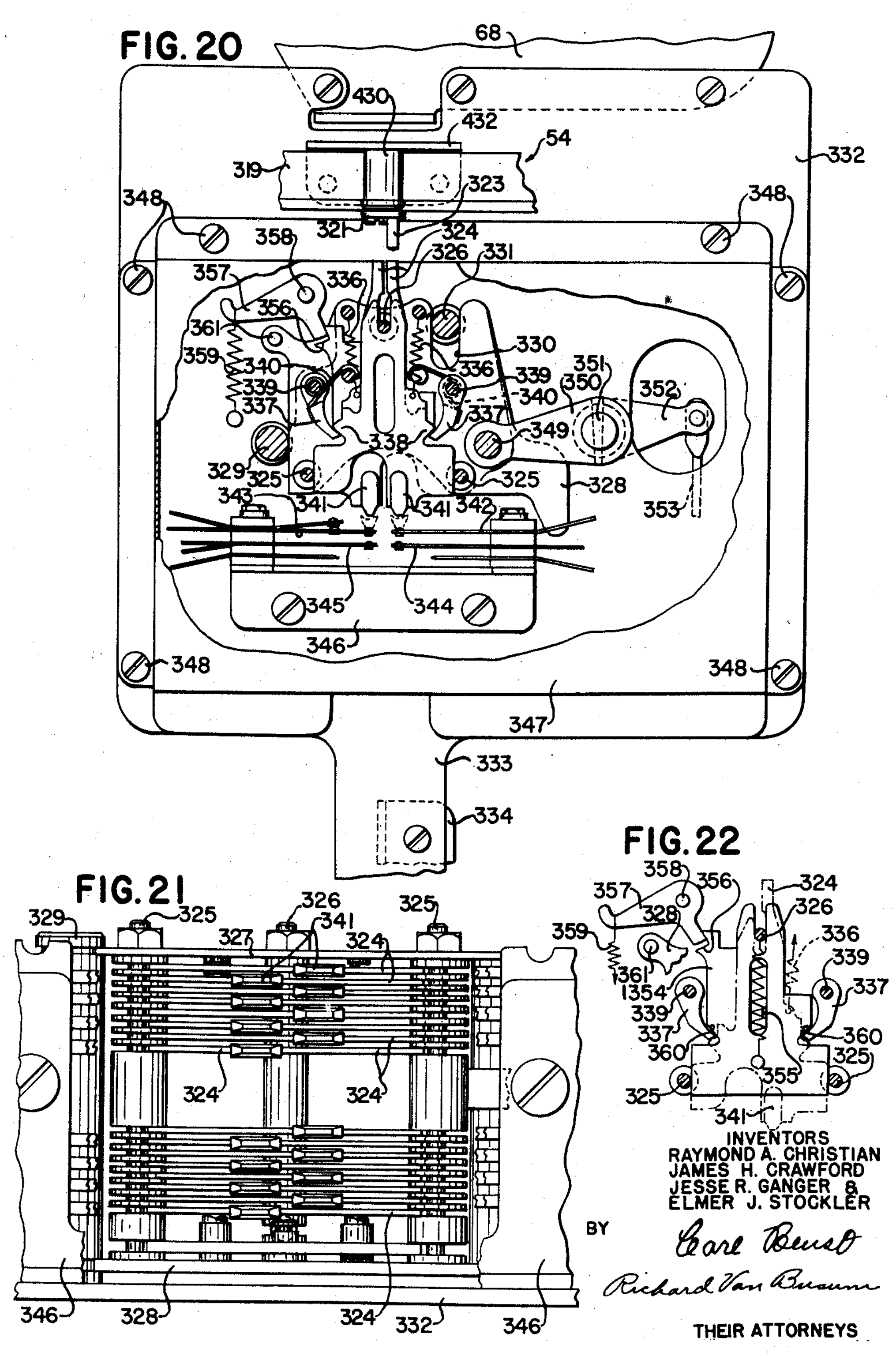

Fig. 20 is a top plan view of the switch mechanism controlled by the traveling carriage in preselected columnar positions, for controlling the operation of the recording unit.

Fig. 21 is a view, as observed from the rear of the machine, of the assembly of switch operating plungers, shown in Fig. 20.

Fig. 22 is a detail view of the retaining and releasing mechanism for the switch plungers shown in Figs. 20 and 21.

Figures 23, 24:
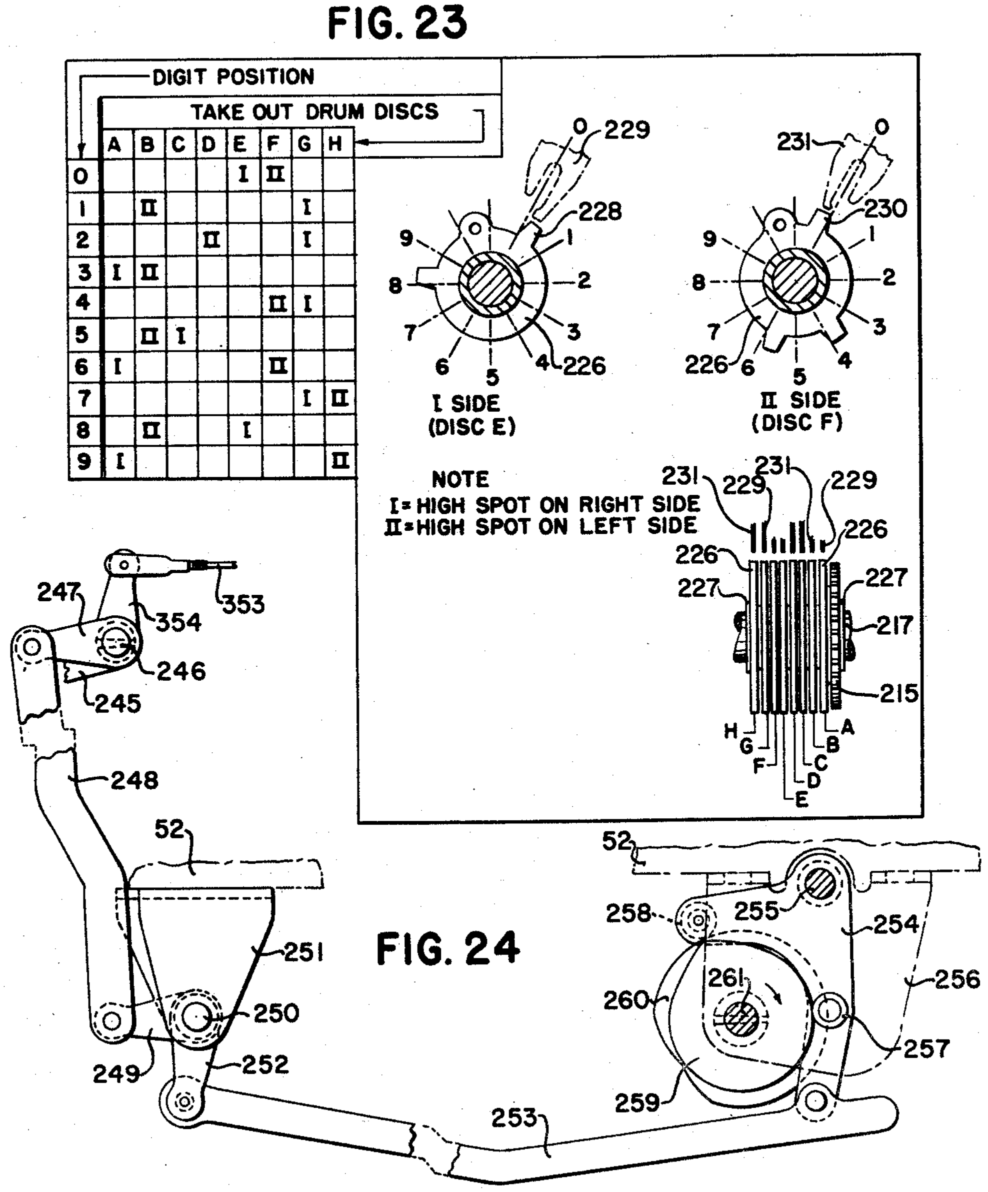

Fig. 23 is a chart depicting in graphic form the amount switch control disks and associated switch operating plungers, for one denominational order.

Fig. 24 is a side elevation, as observed from the right of the machine, of the mechanism for operating the switch operating plungers.

GENERAL DESCRIPTION

The machine chosen as a suitable example, to illustrate the various features of the present invention is of the same general type as that fully disclosed in Letters Patent of the United States No. 2,626,749, issued January 27, 1953, to Raymond A. Christian et al., and application for Letters Patent of the United States, Serial Number 466,292, filed November 2, 1954, by R. A. Christian et al., to which reference may be had for a complete disclosure of the standard features of the machine not pertinent to the present invention and which for that reason will be described in this application, only in general terms. However, mechanism pertinent to the present invention will be fully illustrated and described herein.

Like former machines of this type, the subject machine is provided with a laterally shiftable traveling carriage, which may be tabulated in either direction, from one columnar position to another, or if required, said carriage may be skip-tabulated through intervening columnar positions from one columnar position to a preselected columnar position, all of which is made practical by use of the well known fluid coupling mechanism, which connects the traveling carriage to its driving means. In addition to the usual method of winding record material around the platen roll from the rear thereof, the present machine is provided with a front feed mechanism, which opens and closes a throat located at the front of the platen for the insertion and removal of record material, such as ledger cards and statement sheets at the front of said platen instead of at the rear.

The instant machine is provided with a full complement of amount keys, which control the positioning of corresponding differential actuator mechanisms, which in turn control the setting of corresponding type carriers for recording the values of the effective amount keys upon the record material supported by the traveling carriage platen, and said actuators also control the entering of said values, either poistively or negatively into the wheels of the selected totalizers. Likewise, the amount actuators are connected with and position in relation thereto, corresponding switch operating disks, which in turn control the operation of switch mechanisms, which control the operation of a tape recording mechanism, to transmit the values set up on said actuators and said disks, to the tape recording mechanism, as will be explained later. The present machine may also be provided with a full complement of date keys located to the left of the amount keys, for setting up the date, which may be printed, when required, on the record material supported by the platen of the traveling carriage.

The machine is provided with a continuously running motor, which drives the fluid coupling mechanism for moving the traveling carriage in either tabulating or return directions. The motor also operates, through a main clutch mechanism controlled by depressible release or starting bars located on the right side of the accounting machine keyboard, to drive said machine through one cycle of operation, which is required for all types of functions performed by the machine. In other words, it is to be understood that all functions of the machine, including non-adding, adding, subtracting and positive and negative total-taking, are effected in a single cycle of machine operation. This is a worth while improvement over other machines of this type, many of which require plural cycles of operation to effect positive and negative total-taking functions. In addition to the manual controlling of the main clutch by the starting bars to initiate machine operation, said clutch may be automatically controlled through the medium of the traveling carriage in preselected columnar positions thereof, in all operations except overdraft total-taking or credit balance operations, in which said clutch must be controlled by use of the manually operable release or starting bars as will be further explained later.

Like the machine disclosed in the Christian et al. patent, referred to above, the present machine is provided with the well known electric typewriter mechanism for typing data of a descriptive or other nature on the record material supported by the traveling carriage platen. However, this is a matter of choice, and the electric typewriter mechanism may be omitted if it is not necessary in connection with the business system to which the machine is being applied.

The machine, as at present arranged, is provided with two lines of shiftable totalizers located at the rear thereof, one of said lines supporting a crossfooter or balance totalizer for the computation of positive and negative amounts, and the other of said lines supporting a maximum of eight individual sets interspersed totalizer wheels to provide eight group or storage totalizers. The balance totalizer may be selected and conditioned for engagement with and disengagement from the single set of amount or differential actuators, in proper timing for the type of operation being performed, by means of adjustable stops located on the front of the traveling carriage in predetermined columnar positions thereof, or if necessary or desirable by means of a full complement of corresponding control keys. In a similar manner, the different sets of group or storage totalizers may be selected and conditioned for actuation, by the single set of actuators, by means of the traveling carriage in predetermined columnar positions thereof, with the exception of the total-taking function in said totalizers, which may be controlled either by the traveling carriage or by means of corresponding control keys.

A single tens transfer mechanism, which is common to all of the eight sets of group totalizers, is provided for transferring tens digits from one denominational order to another, in adding and subtracting operations. Selectively, shifting the different sets of group totalizer wheels into alinement with the amount actuators likewise places said wheels in coacting relationship with the tens transfer mechanism. The balance totalizer has a similar tens transfer mechanism for transferring tens digits.

The terms, "overdraft totalizer," "balance totalizer" and "crossfooter," are considered synonymous and will be used interchangeably throughout the description, and this likewise applies to the terms, "storage totalizers" and "group totalizers."

The crossfooter or balance totalizer comprises a single set of add-subtract wheels which coact with the amount actuators in adding and subtracting operations to enter positive and negative amounts in said balance totalizer. Each balance totalizer wheel is geared to a corresponding auxiliary wheel, which is always in complementary relationship thereto, and which in overdraft total-taking operations only is alined with and coacts with the amount actuators to control the positioning of said actuators and their corresponding printing segments to cause the true negative amount of the overdraft to be printed on the record material. In other words, all functions of the balance totalizer, including adding, subtracting, and positive total-taking operations, are effected by engagement of the main wheels of said totalizer with the amount actuators. However, the occurrence of an overdraft in the balance totalizer sets up a condition which causes the auxiliary wheels to be engaged with the amount actuators in total-taking operations only, so that the true negative amount of the overdraft will be recorded. Naturally, after an overdraft occurs in the balance totalizer, add and subtract operations may be continued therein as long as desired, and if during these operations, the balance totalizer changes from an overdrawn or negative condition to a positive condition, the situations referred to above will be reversed so that the main wheels will again be alined with and coact with the amount actuators in total-taking operations.

The above referred to automatic shifting of the balance totalizer line to aline either the main wheels or their corresponding auxiliary wheels with the amount actuators is controlled by a so-called "Fugitive 1" mechanism, which is necessary in a crossfooter or balance totalizer of this type to correct the units or lowest order wheel when the highest order wheel passes through zero while revolving in either a positive or a negative direction.

As previously mentioned, the machine is provided with automatic releasing or starting mechanism, which may be rendered effective by the traveling carriage in preselected columnar positions thereof to initiate automatic machine operations. The occurrence of an overdraft in the balance totalizer causes the automatic releasing mechanism to be rendered inoperative, to inform the operator of the overdrawn condition of the balance totalizer, and as long as said totalizer is in an overdrawn condition the automatic machine operating mechanism remains inoperative, and machine operations must be initiated by means of the manually operable release or starting bars located to the right of the amount keyboard. However, if, during subsequent operations of the machine, the crossfooter changes from an overdrawn condition to a positive condition, the automatic machine releasing mechanism will be again rendered operative.

The basic features of the overdraft and storage totalizers, explained in a general way above, are fully disclosed in United States Patent No. 2,503,865, issued April 11, 1950, to Raymond A. Christian, to which reference may be had for a detailed description of mechanism which is not pertinent to the present invention, and which for that reason will be described only in a general way herein.

The machine chosen to illustrate the present invention has been arranged for transmitting desired data relating to transactions onto a web of comparatively narrow tape material, through the medium of a tape recording device, which may be attached to the machine, and is operated electrically by an unusual switch arrangement located at the rear of the machine, said switch arrangement in turn being actuated by the usual amount actuators.

As mentioned previously, machines of the type referred to above are provided with a horizontally shiftable amount or differential actuator for each denominational order. The amount actuators are positioned by the corresponding rows of amount keys in adding and subtracting operations, and by the corresponding wheels of the selected totalizer in sub-total and total-taking operations. Each actuator is geared to a drum, consisting of a cluster of eight control disks, each of which may have a maximum of five tooth-like projections thereon, arranged to be sensed by a corresponding one of eight sensing plungers mounted in a shiftable framework displaceable angularly in relation to said control disks. The eight plungers for a single denomination have associated therewith eight corresponding switches, fixedly mounted directly above the corresponding switch plungers.

In the first part of machine operation, the amount actuators position the corresponding sets of control disks in relation to the sensing plungers, in accordance with the value set up on said amount actuators, either by the amount keys in adding and subtracting operations, or by the wheels of the selected totalizer in sub-total and total-taking operations. After the disks have been positioned by the actuator racks, the framework carrying the sensing plungers is shifted downwardly and carries the plungers in unison therewith, whereby the projections on the control disks, corresponding to the digits set up on the actuators, are engaged by the corresponding plungers, and said plungers are displaced in relation to the other plungers which remain in ineffective position. The displaced plungers are temporarily held displaced by retaining pawls, and as the sensing plunger framework is returned upwardly from sensing position to normal position, said displaced plungers engage and close the coresponding switches to complete electrical circuits corresponding to the digits set up in the various denominational orders. This causes the data temporarily stored in the amount actuator racks to be transmitted electrically to the tape recording device, which device in turn perforates or otherwise records said data on a web of tape carried thereby.

The encoding system used in the present machine is known as the "2 or 5" code, and with this system it is necessary that two sensing plungers and their corresponding switches be operated for each of the ten digits, including zero, for each denominational amount bank or order. This encoding system requires that two of the disks be positioned with projecting teeth in position to be engaged by corresponding sensing plungers, and said teeth are located on the corresponding disks, according to the code employed, and therefore the digital position of each amount rack brings an appropriate combination of teeth into sensing relationship with the corresponding sensing plungers. In this manner the digit encoding is effected in the recorder switch assembly, thus making it possible for the amount actuator racks to control external electrical circuits in the associated tape recorder device.

It is necessary in the present system of recording of data on tape to maintain a fixed order of entry, so that the relative position of the entry within the "frame" will serve as a means of identification. A "frame" in this instance includes all of the data to be recorded from the entry of an item on the form used in connection with a particular business system, said data being distributed among several columns of said form, thus requiring movement of the traveling carriage through a predetermined program or arrangement of columnar positions. As the traveling carriage moves in prearranged order from one columnar position to another, the numbers or amounts are recorded on the tape in time sequence. In some cases an entry may or may not be required in a certain columnar position and this is controlled by means of a series of switches located at the back of the traveling carriage, which are actuated by means of adjustable stops removably mounted on the traveling carriage at the rear thereof in relation to columnar positions of said carriage. The switch mechanism for the traveling carriage is of the same general type as that used in connection with the amount banks, but in this case the switches operate singly instead of in pairs. Each switch, when operated by the traveling carriage, in predetermined columnar positions, causes an amount to be recorded on the tape. If the switch is not operated, a skip symbol will be recorded in place of the amount. There are sixteen switches in this group, which are controlled by the traveling carriage, fifteen of which may be used in connection with the various columnar positions of the traveling carriage, as explained above, while the sixteenth switch is for controlling the void control relay, as will be explained later.

The tape recording process must not be started before the actuator racks complete their initial movement rearwardly, and this is controlled by a record switch mechanism which is operated by cams on a secondary cam line, which line is connectable to the main cam line for operation thereby in tape recording operations, so as to close said record switch approximately 220 degrees from the start of machine operation, to energize an operating relay to start the tape recording process.

Three control keys, namely, the Void key, S key, and R key, located to the left of the amount keyboard, have been provided with switches for controlling the tape recorder mechanism. The Void key, when depressed, closes a pair of normally open switches, which in turn control the void relay, and the void counter solenoid, to prevent operation of the tape recording mechanism. The Void key also disables operation of the secondary cam line mechanism to obtain safe interlocking conditions. The S key when depressed closes a normally open switch to cause an S control relay to be operated during the machine cycle to cause a special function symbol to be recorded upon the tape. The R key, often referred to as the "Reverse key," when depressed, closes a pair of normally open switch contacts to cause the plus or minus sign symbol to be reversed, to correspond with the reversal of the add and subtract functions during the machine cycle.

The balance totalizer or crossfooter has associated therewith a normally open switch; however, when the crossfooter changes from a positive to a negative, or overdrawn, condition, the overdraft switch is closed to cause the sign symbol to be changed from positive to negative.

The main clutch mechanism, which controls the connection of the operating motor to the machine operating mechanism, has associated therewith, in the present arrangement, a lock-up solenoid, controlled by the tape recorder device, which prevents engagement of the main clutch and thus delays machine operation as long as said solenoid is energized.

The machine has been provided with a manually operable main or master record switch, located at the right of the typewriter keyboard, to allow operation of the mechanical portion of the machine, without the operation of the electrical portion, whenever required. A red indicator lamp, located at the left of the amount keyboard, is lighted when the master record switch is turned on, indicating that the recorder is ready for operation.

The Void key referred to above is also used for the correction of errors, and the depression of this key prevents any further recording on the tape until the error has been corrected in the accounting machine. A clear lamp, located immediately above the red lamp, referred to above, is lighted as long as the Void key is depressed.

The secondary cam line referred to before functions only in connection with the tape recorder mechanism, and therefore it is unnecessary for said auxiliary cam line to operate when the accounting machine is being used independently of the tape recorder mechanism. The secondary cam line is connectable to the main cam line through the medium of a clutch mechanism, which is controlled by the traveling carriage in preselected columnar positions thereof, thus providing means whereby the tape recorder mechanism may be rendered operative when the traveling carriage is in certain predetermined columnar positions, in accordance with the requirements of a particular business application. The secondary cam line controls the operation of the amount switch plungers, the traveling carriage switch plungers, and the operation of the record switch to control the starting of the tape-recording process.

Two multiple plug-in receptacles located at the rear of the machine are provided for engagement by corresponding multiple plug-in connectors, which, through suitable cables, electrically connect the switch mechanisms of the accounting machine to the tape recorder unit. Power input and control circuits to the tape recorder unit are carried through one of the plug-in receptacles and data circuits leading from the amount switches are carried through the other plug-in receptacle.

Mechanism pertinent to the present invention, which was described in general above, will be described in detail in the following pages.

DETAILED DESCRIPTION

*Framework, traveling carriage and operating mechanism*

The main mechanism of the accounting machine, including the keyboard mechanism, the actuator mechanism, the printing mechanism, and the traveling carriage, is supported by and between right and left main frames, 50 and 51 (Figs. 5 and 8B), said frames in turn being secured to a machine base 52. The base 52, in cooperation with various cross frames, bars and rods, supports and maintains the two main frames in proper parallel spaced relationship to each other. The mechanism of the machine is enclosed in a suitable case or cabinet 53 (Fig. 1) which is fabricated in several parts or sections so as to give ready access to different portions or units of the machine, said case being secured to the machine framework and to the base 52. For convenience, the machine is mounted on a stand 48, said stand being provided with adjustable feet for leveling the machine, and also being provided with two wheels journaled in rearward extensions of the bottom cross member of said stand, to facilitate the transporting of the machine from one location to another. The tape recording unit, which is used in connection with the accounting machine, is contained in a rectangular case 49 (Fig. 1) which, if desired, may be secured to the stand 48, thus combining the electrical and mechanical portions of the machine into an integral unit for convenience of operation and service. The case 49 for the tape recorder is provided with various closures for giving access to the important portions of the recorder, and the top surface of said case forms a desk or table top for use in connection with the accounting and recording units.

The machine is provided with a laterally shiftable traveling carriage 54 (Figs. 1, 8A and 8B) comprising right and left end frames and housings connected at the rear by a Z-shaped bracket 55 and a bottom plate 56, and connected at the front by means of a horizontal bar 57 secured at opposite ends to two angular brackets 58 (only one shown here) said brackets in turn being secured to the corresponding end frames of the carriage. The traveling carriage is shiftably supported at its rear by means of a tubular rail 59, secured to the bottom plate 56, and riding on a plurality of rollers 60, in turn rotatably mounted on a bar 61, secured to the main frames of the machine. The rail 59 is retained in accurate engagement with the rollers 60 by several angular rollers 62, located on either side thereof, some of said rollers being mounted directly on the upper edge of the bar 61, and the remainder of said rollers being mounted on studs, in turn secured in said bar 61. The traveling carriage is further shiftably supported at its front by means of a longitudinal channel in the bar 57, which engages a plurality of rollers 63 mounted on a plate 64, in turn secured to the machine framework.

Secured to the lower portion of the bracket 55 (Fig. 8B) is a longitudinal rack 65, the teeth of which mesh with a gear 66 secured on the upper end of a vertical shaft 67 journaled at its upper end in a plate 68 secured to the bar 61, and journaled at its lower end in the top portion of a fluid drive housing 71 secured to the machine base 52. Secured on the lower end of the shaft 67 is a wide-faced gear 69, which meshes with a shiftable reversing gear 70 journaled in the housing 71. The gear 70 is connectable to either of reversibly driven gears (not shown) which are in turn non-positively operated by the fluid drive mechanism. When the gear 70 is in its upper position, as shown here, it drives the shaft 67 and the traveling carriage in a lefthand or tabulating direction (Fig. 1) and when said gear 70 is shifted downwardly it drives said shaft 67 and the traveling carriage in a righthand or return tabulating direction.

The fluid drive mechanism for shifting the traveling carriage in tabulating and return directions is operated through the medium of a continuously running electric motor (not shown), which is secured to the machine base 52, and which also operates the accounting machine mechanism.

The tabulating movements of the traveling carriage 54 in both forward and return directions are controlled by means of an escapement mechanism (not shown), which engages teeth on the lower edge of the bar 57 (Figs. 1 and 8A), said escapement mechanism being controllable either manually, by means of the starting bars and other control keys, or automatically, by means of the traveling carriage in preselected columnar positions thereof, as fully disclosed in the Christian et al. patent and application referred to previously. Removably attached to the bar 57 (Figs. 1 and 8A) is a stop bar 72, having adjustably mounted thereon a plurality of stops 73, located in predetermined columnar positions of the traveling carriage, said stops carrying control plates 74, which coact with sensing fingers 75 connected to corresponding sensing levers, to control the various functions of the machine. The stops 73 likewise may be provided with forward and return tabulating lugs, which control the forward and return tabulating movements of the traveling carriage, to locate said carriage in preselected columnar positions, while traveling in either direction, a lug for unlocking the machine releasing mechanism, and if desired, a lug for automatically initiating machine operation. The bar 72, with its assembly of control stops 73 (Fig. 1) may be readily removed from the machine and replaced with another bar, having other stops located in different columnar positions, and with a different arrangement of the control plates 74, and control lugs, for quickly adapting the machine for use in connection with various programs or various business systems. Likewise the stops 73 may be quickly adjusted to any position on the bar 72 to readily arrange the columnar positions of the traveling carriage to agree with the divisions of different types of record material supported by the traveling carriage.

Rotatably mounted in the traveling carriage framework 54 (Figs. 1, 8A and 8B) is a platen roll 76 for supporting record material such as a journal sheet 77 in printing position, said journal sheet, in this instance, being unwound from a supply roll 78, supported by the traveling carriage, and fed beneath and around said platen roll 76 from the rear. The journal sheet 77 is retained in feeding engagement with the face of the platen roll by means of rear pressure rollers 79 and front pressure rollers 80. In addition to back-fed record material, such as the journal sheet 77, the machine is provided with a front-feed throat for guiding record material, such as ledger cards 81 or statement sheets around the front of the platen roll and into printing position. The front feed throat includes a rockable front feed guide 82 made of suitable transparent plastic material, which, when in closed throat position, as shown in full lines in Fig. 8A, retains the front-fed record material 81 in printing position around the platen roll 76. The front-feed guide 82 is movable from closed position to open position, as indicated in dot and dash lines in Fig. 8A, and during such movement the front pressure rollers 80 are moved out of engagement with the face of the platen roll, and in conjunction with said guide 82, form a front feed throat, which directs the record material 81 around the front of the platen and into a guide chute 83 (Fig. 8B) located at the rear of the traveling carriage. The lower edge of the guide 82 forms a line finder, for use in locating the desired line of the record material in proper printing relationship with the type carriers.

The front pressure rollers 80 and the guide 82 are moved from closed to open-throat position, and vice versa, through the medium of mechanism comprising a tube 84 (Fig. 8B) journaled in the carriage framework and connected by a plurality of posts to a rod 85, which slides between parallel faces of two blocks 86, pivotally mounted on a plate 87. The plate 87 is shifted from one position to another, to operate the front feed throat through the medium of a clutch device (not shown) which connects said plate to the continuously running operating motor.

Either front-fed or back-fed record material, supported by the platen roll 76 (Figs. 8A and 8B) may be line-spaced by rotation of said platen roll in a clockwise direction, through the medium of mechanism comprising a tube 88, journaled in the carriage framework, and connected by posts 89 to a rod 90, which is maintained in yielding engagement with an operating roller 91 mounted on an arm 92 secured on the upper end of a vertical shaft 93, journaled in the plate 68, and in the base 52. The lower end of the shaft 93 is connected through a linkage to a clutch mechanism (not shown) for clutching said shaft to the continuously operating motor for operation thereby. The clutch mechanisms for the front feed throat and the line-spacing mechanism may be rendered operative by means of the machine release bars, by means of corresponding control keys, or by means of the traveling carriage in preselected columnar positions thereof, to open or close the front-feed throat and to rotate the platen roll to line-space the record material supported thereby.

The above somewhat general, description of the traveling carriage mechanism is believed to be adequate for the present purpose, however, if a more detailed description of this mechanism is required, reference may be had to the United States Patent No. 2,626,749, mentioned before, which contains a full disclosure of said mechanism.

*Keyboard*

Figures 1, 2:
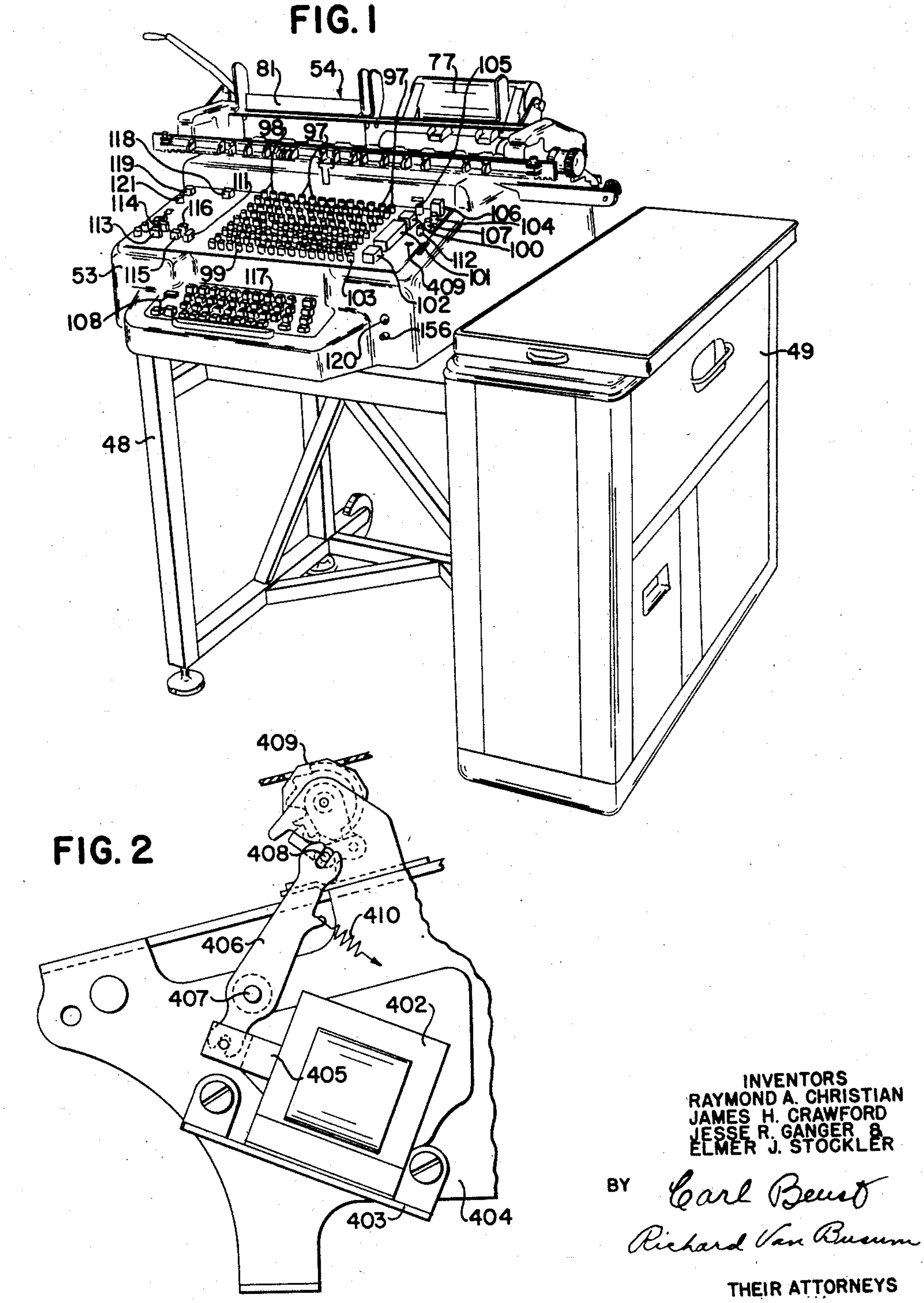
Fig. 1 is a perspective view of a known type of accounting machine having a tape recording device located at its right side.
Fig. 2 is a detail right side elevation of a solenoid-actuated increment or step-by-step counter for automatically counting certain types of operations.
Figure 3:
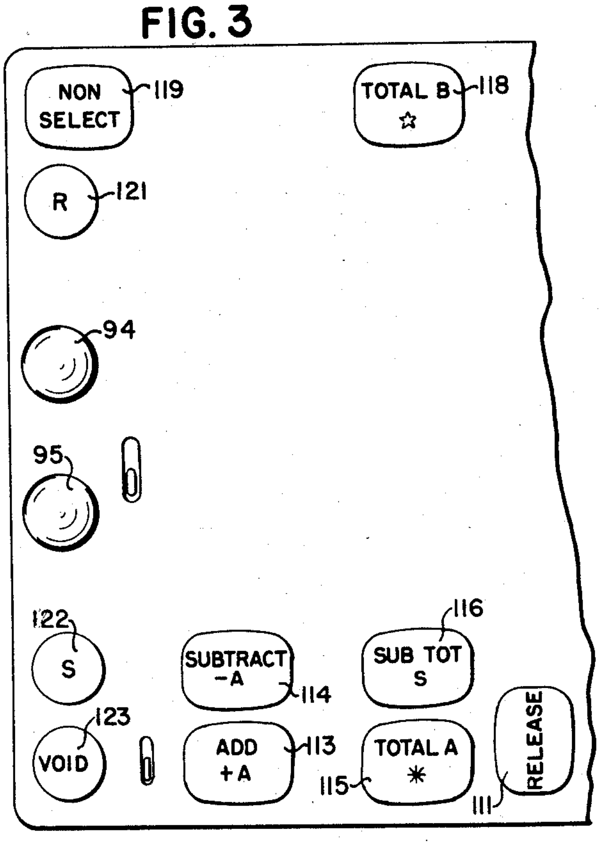
Fig. 3 is a fragmentary view of the left-hand portion of the accounting machine keyboard showing certain of the control keys.

Directing attention to Figs. 1, 3 and 8A, the accounting machine keyboard comprises an amount key unit assembly 96, containing a plurality of denominational rows of amount keys 97, a complete complement of date keys 98, symbol keys 99, and a tabulating key 103, and said unit 96 may be removed from and replaced in the machine in its entirety in case this is necessary for inspection or repair. The date keys 98 are normally stay-down keys in that they are not normally released near the end of machine operation, as are the amount keys. However, said date keys are provided with a non-repeat key, which upon depression causes said keys to be automatically released near the end of machine operation, in case it is not desired to repeat-print the date in succeeding operations. A release key is provided for releasing all the depressed date keys, except the year keys, when the machine is at rest. The symbol printing keys 99 are located in the same row as the year date keys and may be used to print symbols for identification purposes, upon the record material. The amount keys 97 are of flexible construction, whereby the depression of one key in a particular denomination or row releases any previously depressed key in said row, and so on.

The accounting machine keyboard also includes a Vertical release bar 100, a Main release bar 101, and a Skip release bar 102, located to the right of the amount keys 97, said release bars being manually depressible to initiate operation of the machine. In addition to releasing the machine for operation, the release bars may be arranged to control other functions of the machine, including tabulation of the traveling carriage and line-spacing of the record material supported by the platen roll. The functions of the Main release bar 101 may be further controlled through the medium of a selecting lever (not shown) having three positions, for controlling the tabulating function of the traveling carriage, and the rotation of the platen roll for line-spacing the record material.

The release bars 100, 101 and 102 (Fig. 1) have two stages of depression, often referred to as "touch" and "hold," and function in the manner explained above upon normal or "touch" depression. In "touch" depression, pressure is released from the release bars immediately after they are depressed and in "hold" depression pressure is retained on said bars after they have been depressed, and they are thereby rendered operative to control different functions of the machine from those controlled by said bars when they are "touch" depressed, said functions including tabulation of the traveling carriage in both forward and return directions, and rotation of the platen roll to line-space the record material supported thereby.

The traveling carriage 54 (Figs. 1 and 8A) may be manually released for forward tabulating movement by depression of the tabulating key 103, which causes said carriage to tabulate from one columnar position to the next. Likewise the reverse or return tabulating movement of the traveling carriage may be controlled by a reverse tabulating key 104, depression of which causes the traveling carriage to be tabulated in a reverse direction from one columnar position to the next. A carriage release key 105 is provided for releasing the traveling carriage escapement mechanism so that said carriage may be moved in either direction, as long as said key 105 is retained depressed. The accounting machine keyboard also includes a carriage throat key 106, depression of which causes the front feed throat to be opened or closed, depending upon which position it is in when said key is depressed.

As previously explained, the machine may be automatically released for operation by the traveling carriage in preselected columnar positions thereof, and this feature may be rendered inoperative by depression of a Non-Auto key 107. The Non-Auto key 107 is a stay-down key, that is, not released automatically at the end of machine operation, and functions to render the automatic releasing mechanism inoperative, so long as said key is in depressed position. A release key 112, located immediately below the Non-Auto key 107 (Fig. 1), is provided for releasing said Non-Auto key, when desirable. The functions of the machine may be further controlled by control surfaces on four positionable slides (not shown) which are positioned under control of the release bars 100, 101 and 102, or under control of the traveling carriage 54 in preselected columnar positions thereof. The positionable slides may be fashioned so as to provide the required control surface to obtain the necessary results in connection with the business system to which the machine is being applied. A main Release key 111 is provided for manually releasing the depressed amount keys 97 and the symbol keys 99 at any time when the machine is at rest, and said Release key also functions to release the depressed date keys 98, when the date non-repeat key is depressed and the machine is at rest.

The accounting machine keyboard also includes a full complement of control keys for controlling the functions of the balance totalizer which, as previously explained, is often referred to as a crossfooter, and these control keys include an Add key 113 (Figs. 1 and 3), a Subtract key 114, and a Total key 115. When used alone, the Total key 115 causes the balance totalizer to be reset or totalized, and when used in conjunction with a Sub-Total key 116 causes said totalizer to be read or sub-totalized. A Total key 118 is provided for conditioning any selected totalizer on the group totalizer line for a resetting or total-taking operation, and like the Total key 115 for the balance totalizer, may be used in conjunction with the Sub-Total key 116 to condition any selected group totalizer for a reading or sub-total-taking operation. The accounting machine keyboard also includes a Non-Select key 119, depression of which renders the traveling carriage control mechanism ineffective for selecting and conditioning the various totalizers for different functions. A Reverse key 121 is provided for reversing the adding and subtracting functions in both the balance totalizer and the group totalizers for the purpose of making corrections, and for other uses. This key is effective only when the selection and functions of the various totalizers are being controlled by the traveling carriage, and therefore is not effective when said functions are being controlled by the control keys 113 to 116 inclusive, and by the control key 118.

In the present machine a switch has been added to the Reverse key 121 for the control of the sign symbol as it is recorded along with certain amount entries on the recording tape. The closing of said switch by depression of the Reverse key causes the sign symbol to be reversed to correspond with the reversal of the add and subtract functions of the totalizers, as explained above. Located in the lower lefthand corner of the keyboard is a special function symbol or S key 122, operation of which closes a normally open switch to cause a special symbol to be recorded upon the tape during a machine cycle. Located jus beneath the Special symbol key 122 is a Void key 123, operation of which closes a normally open switch which in turn controls a void relay and a void counter solenoid. The Void key 123 is used in connection with the correction of certain errors made in the recording of data upon the tape, and operation of said key renders the tape recording mechanism inoperative during the machine cycle in which said key is operated.

Located on the left side of the accounting machine keyboard, just above the S 122 (Figs. 1 and 3), are a clear signal light 94, and a red signal light 95, said clear signal light 94 being lighted when the Void key 123 is effective, and is used to indicate that the recorder is temporarily inoperative. The red signal light 95 (Figs. 1 and 3), is controlled by a Master recorder switch 156, located on the righthand side of the machine case, said signal light being lighted when said Master recorder switch 156 is in "On" position, to indicate that the tape recorder is operating. When the Master switch 156 is in "Off" position, the tape recorder portion of the machine is inoperative, and the machine may be used as an ordinary mechanical accounting machine. A signal light 120 located immediately above the Master recorder switch 156 (Fig. 1) is lighted when said Master switch is in "On" position, and serves as a further reminder that the tape recorder is conditioned for operation.

The present machine is provided with an electric typewriter attachment comprisnig a full complement of typewriter keys 117, located in front of and below the accounting machine keyboard, for typing data of a descriptive, instructive, or other nature, upon the record material supported by the platen roll. The typewriter keyboard comprises the usual control keys for controlling the various functions of the traveling carriage, and also includes an "On" and "Off" toggle switch 108 for controlling the flow of current to the continuously running motor which operates the accounting machine mechanism.

*Amount key bank construction*

The amount key bank, and its associtaed differential mechanism, shown in Figs. 8A and 8B, will be described as representative of all the amount banks, inasmuch as these banks are similar in construction and operation.

The amount keys 97 for the amount bank shown in Fig. 8A are supported for vertical sliding movement on a corresponding partition plate 124, which forms a part of the removable amount keyboard framework. Compressible springs (not shown) urge the amount keys 97 upwardly to normally maintain them in undepressed position, as shown here. Each of the amount keys 97 has a pin 125 in its stem, which cooperates with a corresponding camming surface formed in an opening in a control plate 126. The pins 125 coact with angular noses formed on corresponding extensions on a flexible detent 127, said angular noses terminating in latching shoulders which, in cooperation with flattened upper surfaces on the pins 125, retain said keys in depressed position. The pins 125 likewise have flattened lower surfaces, which coact with corresponding locking teeth formed in openings in a locking detent 128, said detent 128, the control plate 126, and the flexible detent 127 being mounted for horizontal sliding movement on the partition plate 124, in the usual manner. A spring 129 tensioned between the control plate 126 and the flexible detent 127, urges said parts rearwardly and forwardly, respectively, to normally maintain the angular camming surfaces in the openings in said control plate 126 in yielding engagement with the corresponding pins 125, and to normally maintain the corresponding angular camming noses of the flexible detent 127 in yielding contact with said pins 125.

Depression of one of the amount keys 97 causes the pin 125 therein, in cooperation with the corresponding angular nose, to shift the flexible detent 127 rearwardly against the action of the spring 129 (Fig. 8A) and after the flat upper surface of said pin passes beyond the shoulder on said extension, the spring 129 returns said detent a slight distance forwardly to latch the shoulder over the flat surface to retain said key 97 depressed. Depression of an amount key 97, after a key in the same row has formerly been depressed, causes the pin 125 in said latter depressed key to shift the detent 127 rearwardly to release the formerly depressed key, to provide what is termed in this art as "flexible key action."

The locking detent 128 has an upward extension 130, with a rounded nose, which is maintained in yielding contact with an operating projection 131, fast to a key lock shaft 132 journaled in the keyboard framework, by a spring 133 tensioned between said extension and said projection. At the beginning of machine operation, counter clockwise movement of the key lock shaft 132

(Fig. 8A), through the spring 133, yieldingly carries the locking detent 128 rearwardly in unison therewith to move the teeth in the openings in said detent beneath the corresponding flat lower surfaces on the pins 125 to lock all undepressed amount keys in undepressed position, during machine operation. Near the end of machine operation, the shaft 132 is restored counter clockwise to move the locking detent 128 forwardly to ineffective position, and simultaneously a key release shaft 134, journaled in the keyboard framework, receives counter clockwise key-releasing movement. This movement of the shaft 134, through an arm, in cooperation with a corresponding upward extension of the flexible detent 127, shifts said detent rearwardly, against the action of the spring 129, to disengage the shoulder from the upper flat surface on the pin 125 of the depressed amount key 97, to free said key to the action of its spring, which immediately restores said key upwardly to undepressed position. The key release shaft 134 functions in the manner explained above, in adding and subtracting operations, to release the depressed amount keys 97 at the end of machine operation. However, in total and sub-total operations said shaft 134 will receive its counter clockwise releasing movement near the beginning of machine operations to release any inadvertently depressed amount keys prior to such operation and thus prevent the possibility of an erroneous total being printed.

*Amount differential mechanism*

Each of the amount keys 97 (Fig. 8A) has secured in the lower end of its stem a square stud 135, which coacts with a corresponding stop shoulder 136, formed on graduated steps on a key stop slide 137 shiftably connected to a corresponding pitman 138, the forward end of which pitman engages a corresponding side-spacing slot in a bar 139 mounted in the keyboard framework. The slide 137 is disengageably connected to the pitman 138 by a latch 140 pivoted on a stud 141 in said slide, said latch being urged clockwise by a spring 142 to normally maintain a shoulder 143 on its rear end in the path of a tooth 144 integral with the pitman 138. In adding and subtracting operations the slide 137 and the pitman 138 operate back and forth in unison as a single unit, and under such conditions the latch 140 remains latched over the tooth 144, as shown here.

As explained previously, the key release shaft 134 (Fig. 8A) receives counter clockwise movement at the beginning of total and sub-total operations to release any inadvertently depressed amount key 97. Secured to the shaft 134 is an arm 145 pivotally connected at 146 to the upper end of a bar 147. The bar 147 has a slot in its lower end which freely engages a guide stud 148 in the partition plate 124. Counter clockwise movement of shaft 134 and arm 145 shifts the bar 147 downward to cause a lower surface 149 thereon to engage a bent-over ear 150 on the latch 140, and rock said latch counter clockwise against the action of the spring 142. This moves the shoulder 143 out of the path of the tooth 144 to disconnect the slide 137 from the pitman 138, so that said slide may remain stationary while the pitman moves rearwardly to be positioned under control of the selected totalizer wheel, in a manner to be explained later. The above latch mechanism provides an extra safety measure to prevent the printing of an erroneous total, by insuring that the inadvertent or unintentional retention of an amount key 97 in depressed condition will not influence the positioning of the pitman 138 in total and sub-total operations.

After the latch 140 has been disengaged, as explained above, and the pitman 138 has moved rearwardly, independently of the slide 137, clockwise restoring movement of the shaft 134 and the bar 147, frees said latch 140 to the action of the spring 142, which restores said latch clockwise until an extension 151 thereof comes into contact with a stud in said slide 137, to which one end of the spring 142 is connected. This retains the latch 140 in proper engaging relationship to the tooth 144, so that said parts will coact properly upon restoring movement of said pitman 138, in a forward direction. Restoration or forward return movement of the pitman 138, causes the tooth 144 to by-pass the shoulder 143 on the latch 140 just prior to contact of abutting shoulders on the slide 137, and said pitman 138, to again couple said parts for concert movement.

The pitman 138 (Fig. 8A) has secured near its forward end a zero stop block 152, the upper edge of which coacts with teeth on a zero latch 153 free on a rod 154 supported in the keyboard framework. A bent-over upward extension of the latch 153 is maintained in yielding contact with the forward end of the control plate 126 by a spring 155 tensioned between said extension and a stud in said control plate. Depression of one of the amount keys 97 causes the pin 125 therein, in cooperation with the corresponding camming surface in the opening in the plate 126, to shift said plate forwardly against the action of the spring 155, causing said control plate to rock the zero latch 153 counter clockwise to move the teeth thereon out of the range of the stop block 152, to free the pitman 138 for positioning movement rearwardly, as will be explained later. If no amount key 97 is depressed in the denominational order being described, the zero latch 153 will remain effective, and in cooperation with the block 152 will retain the pitman 138 in its forward or zero position, as shown here.

In total and sub-total-taking operations it is necessary to release the zero latch 153, to free the pitman 138 for rearward movement so that said pitman may be positioned under control of the corresponding wheel of the selected totalizer, and this is accomplished by counter clockwise movement of the key release shaft 134 near the beginning of total and sub-total operations, counter clockwise movement of the shaft 134, through an arm secured on said shaft, in cooperation with an upward camming extension on the control plate 126, shifts said control plate forwardly against the action of the spring 129, to rock the zero latch 153 counter clockwise to ineffective position to free the pitman 138 for positioning movement rearwardly under control of the corresponding totalizer wheel.

A hole in the rear end of the pitman 138 (Fig. 8A) freely engages a stud 157 in a reducer segment 158 free on a shaft 159 supported by the machine framework. The segment 158 is pivotally connected by a link 160 to a printing sector 161 freely connected to the upper end of an arm 162, in turn rotatably supported on a shaft 163 journaled in the machine framework. The arm 162 is connected to an operating arm 164 by a pin and slot connection, and an anti-rebound pawl 165, in cooperation with a comparatively strong printing sector operating spring 166, forms a yieldable connection between said arms 162 and 164 to prevent excessive rebounding of the printing sector 161 after its printing stroke, and thereby overcomes the danger of smudging the printing on the record material. The operating arm 164 has a tooth normally engaged by a printer operating trigger 167 mounted in the machine framework. Another tooth on the operating arm 164 cooperates with a tooth formed on the upper end of a zero elimination pawl 168 free on a rod supported by the machine framework and having a downwardly extending tail, which coacts with a stud 170 carried by the segment 158. A spring 169 urges the pawl 168 clockwise to normally maintain said pawl in effective position, as shown here.

A comparatively strong spring 171 (Fig. 8A) is tensioned between the segment 158 and a spring plate connected to a cross-bail 172, extending between similar arms 173 (only one shown here) of a carrying frame, said arms being free on the shaft 159. The spring 171 normally maintains an inward surface of the segment 158 in yielding engagement with a forward surface of the cross-bail 172. The leading frame bail 172 operates first rearwardly or counter clockwise, and through the spring 171 carries the segment 158, the pitman 138, and the slide 137 rearwardly in unison therewith until such movement is terminated in adding and subtracting operations, by the stud 135 in the depressed amount key 97 coming into contact with the corresponding step 136 on said slide 137. This obstructs further movement of the pitman 138, and, through the segment 158, positions the printing sector 161 in accordance with the value of the depressed amount key. The leading frame bail 172 continues its rearward movement without interruption, stretching the spring 171. Initial movement of the segment 158 in a counter clockwise direction causes the stud 170 to rock the zero elimination pawl 168 counter clockwise, against the action of the spring 169, to move the tooth of said pawl out of the path of the tooth of the operating arm 164.

After the leading frame bail 172 has completed its initial movement in a counter clockwise or rearward direction, and after the printing sector 161 has been positioned, as explained above, the trigger 167 is rocked counter clockwise out of engagement with the tooth on the arm 164, to free said arm and its companion arm 162 to the action of the spring 166, which carries said arms and the printing sector 161 rearwardlly, causing said sector to engage first an inking ribbon (not shown) and then the record material supported by the platen 76, to print the value of the depressed amount key 97 on said record material. Clockwise printing movement of the arm 164 (Fig. 8A) is terminated by a surface 174 on said arm coming into contact with a stop bar 175 supported in the printer framework. However, the flexible connection formed by the anti-rebound pawl 165 and the spring 166, permits the arm 162 and the printing sector 161 to travel independently of the arm 164 the slight distance necessary to complete the printing stroke. Immediately after the printing stroke has been completed, the spring 166, through the pawl 165, returns the arm 162 and the printing sector 161 a slight distance away from the platen roll, so that any rebounding action of said printing sector will be absorbed by said pawl 165 and said spring 166.

The segment 158 has on its outer periphery alining teeth 176, which cooperate with an alining bar 177, extending between companion arms 178 (only one shown here) secured on an aliner shaft 179 journaled in the machine framework. Also secured on the aliner shaft 179 is a cam arm 180 yieldably connected to a companion arm 181, free on said shaft 179, by a comparatively strong spring 182 to form a connection which can yield in case the aliner 177 momentarily stumbles on one of the alining teeth 176. The arms 180 and 181 carry rollers which cooperate, respectively with the peripheries of companion plate cams 183 and 184, secured on a main cam shaft 185, journaled in brackets depending from the lower surface of the base 52, said cam shaft making one clockwise revolution (Fig. 8A) each machine operation to operate the mechanism of the machine. After the segment 158 has been positioned under control of the depressed amount key 97, as explained above, and prior to operation of the printing sector 161, the aliner 177 receives initial clockwise movement, under control of the cams 183 and 184, to engage the teeth 176 to secure the segment 158 printing sector 161 and connected parts in set positions during printing movement of said sector 161.

When no amount key 97 is depressed, in the bank illustrated in Fig. 8A, the segment 158 remains in home or zero position, as shown here, and consequently the zero elmiination pawl 168 remains effective to block operation of the arm 164, when the printing trigger 167 is released, as explained above, to prevent the printing of zeros in orders in which no amount key is depressed. In all types of operations, it is desirable that the zeros in the lower orders print, when an amount key is depressed in a higher order, and to effect this, the pawl 168 is operatively connected to its adjacent lower order pawl and when said pawl 168 is moved counterclockwise by movement of the segment 158 out of home position, it rocks the adjacent lower order pawl out of engagement with the corresponding tooth of its operating arm 164, to free said arm so that printing movement will be imparted to the lower order printing sector to record a zero in said adjacent lower order, and this action continues throughout all the lower orders.

The operation of the printing arm 162 (Fig. 8A) and the corresponding printing sector 161 may be controlled by the traveling carriage 54 in preselected columnar positions thereof, through the medium of proper ones of the control plates 74, in cooperation with the corresponding sensing fingers 75, which in turn control the positioning of a non-print bail 187 in relation to an upper projection on the arms 164, the inner surface of said bail being machined in the required manner to form steps which control the operation of said arms 164 and their corresponding printer sectors 161. In this case the length of the control plate 74 controls the inward movement of the bail 187 to determine whether one or more of the control steps thereon will coact with the corresponding projections on the arms 164.

Printing movement of the printing sectors 161 may be further controlled by the traveling carriage 54 in preselected columnar positions thereof, through the medium of adjustable cam fingers 189 (Fig. 8A) mounted on the control stops 73. The fingers 189 are adjustable inwardly from ineffective position to two effective positions to control the movement of a coacting cam lever 190. The lever 190 is connected to and operates a printing control bail 188, which in turn coacts with projections on the printing arms 162 to obstruct the clockwise printing movement of said arms when said bail is positioned over the corresponding projections. As in the case of the bail 187, the bail 188 may be machined in any required manner so that when the finger 189 is adjusted to impart partial movement to the lever 190, certain machined surfaces of said bail 188 will become effective to coact with the corresponding projections on the arms 162 to obstruct printing movement of said arms and the sectors 161. When the same finger 189 is adjusted to impart full movement to the lever 190, the entire machined surface of the bail 188 will become effective to coact with the projections on the printing arms 162 to obstruct printing movement of said arms and the corresponding printing sectors 161.

The pitman 138 (Figs. 8A and 8B) for the amount bank being described, is pivotally connected by a link 192 to a corresponding lever 193 free on a shaft 194, supported in the machine framework. A downward extension of the lever 193 carries a stud 195, which engages a vertical slot 196 in the forward end of a differential actuator rack 197, supported for horizontal sliding movement by means of slots in upward extensions of a sub-base 198 secured to the main base 52. The rack 197 is retained in the slots in the sub-base 198 by horizontal bars 199 and 200, which are secured to finished surfaces or pads formed on the sub-base 198. From the foregoing description it should be understood that any differential positioning imparted to the segment 158 by the amount keys 97, will, through the link 192 and lever 193, be also imparted to the differential actuator rack 197 to position said rack in accordance with the value of the depressed amount key.

*Totalizers in general and their actuation*

Gear teeth 201 (Fig. 8B) formed on the upper edge of the actuator rack 197 are arranged to be engaged with similar teeth formed on a balance totalizer main wheel 202 for the same order, said wheel being rotatably mounted on a tubular shaft 204 supported for horizontal shifting movement in a balance totalizer framework 205. The framework 205 is mounted for vertical shifting movement to engage and disengage the wheel 202 and the rack 197 in proper timing for the type of operation being performed. The main wheel 202 for the order being described is in constant mesh with and drives in a reverse direction a companion auxiliary wheel 203 which is rotatably supported on a tubular shaft 207 mounted in the balance totalizer framework 205 for horizontal selecting movement and for up and down engaging and disengaging movement in unison with its companion shaft 204. The wheel 203 has teeth which are arranged to be engaged with the teeth 201 in the rack 197 during overdraft total-taking operations in the balance totalizer, to control positioning of said actuator and the connected printing sector 161 in such operations to cause a true negative amount of the overdraft to be printed upon the record material, as is fully explained in the previously mentioned Christian application, Serial Number 466,292.

The teeth 201 in the actuator rack 197 likewise coact with teeth in corresponding order wheels 208 of a series of group or storage totalizers, rotatably mounted on a tubular shaft 209 (Fig. 8B) in turn supported for horizontal shifting movement, to select the different sets of group totalizers, in a group totalizer framework 210, said framework being mounted for vertical shifting movement in the machine to engage and disengage the selected group totalizer wheel 208 and the actuator 197 of the denominational order being described. The group totalizer assembly 210, in the present adaptation, has eight sets of group totalizer wheels 208. However, this is a matter of choice, as the group totalizer assembly may be provided with any lesser number of sets of group totalizer wheels 208 on the line 209, if desirable.

In adding and subtracting operations, the group totalizer line 209 (Figs. 8A and 8B) is first shifted horizontally to aline the selected set of group totalizer wheels 208 with the corresponding amount actuators 197, which are later positioned in the manner explained before, in accordance with the value of the depressed amount keys 97. In adding operations, after the actuator rack 197 has been positioned by the depressed amount key, and after the carrying frame bail 172 has completed its initial movement rearwardly downward engaging movement is imparted to the framework 210 to engage the corresponding selected wheel 208 with the actuator 197 prior to its forward or return movement, which movement advances said wheel in an additive direction to enter therein the value of the depressed amount key. After the actuator 197 has completed its return movement, upward disengaging movement is imparted to the group totalizer assembly 210 to disengage the corresponding wheel 208 from said actuator.

In subtracting operations, the selected group totalizer wheel 208 is engaged with the actuator rack 197 prior to its initial movement rearwardly. Initial movement of the actuator 197 rotates the selected totalizer wheel 208 in a reverse or subtractive direction until rearward movement of said actuator is terminated by the depressed amount key 97 to subtract from said wheel the value of said depressed amount key. After the actuator 197 and the leading frame bail 172 have completed their initial rearward movements in subtracting operations, upward disengaging movement is imparted to the group totalizer assembly 210 to disengage the wheel 208 from said actuator 197 prior to its return movement, after which said actuator is restored forwardly to its normal or zero position, as shown here. What has been said above concerning engaging and disengaging movement of the group totalizer assembly 210 in adding and subtracting operations applies equally as well to the balance totalizer assembly 205, which is actuated in adding and subtracting operations exactly in the same manner as explained for said group totalizer assembly 210.

In sub-total and total-taking operations, often referred to as "Reading" and "Resetting" operations, the group totalizer line 209 (Fig. 8B) is shifted first in a horizontal direction to aline the selected set of group totalizer wheels 208 with the actuators 197, and as in subtracting operations, the group totalizer frame or assembly 210 receives downward engaging movement to engage the corresponding wheel 208 of the selected group totalizer with the actuator 197 prior to its initial movement. As explained previously, in the beginning of total-taking operations, the key release shaft 134 (Fig. 8A) receives counter clockwise movement to shift the bar 147 downwardly to disengage the latch 140 from the tooth 144 to disconnect the key stop slide 137 from the amount actuator pitman 138 so that said pitman is free to be positioned under control of the selected totalizer wheel, without the danger of being maladjusted through inadvertent depression of or retention in depressed condition of one of the corresponding amount keys 97. Likewise, initial counter clockwise movement of the key release shaft 134 shifts the control plate 126 forwardly, in the manner explained before, to rock the zero latch 153 counter clockwise to ineffective position, to free the actuator pitman 138 for rearward positioning movement.

Initial rearward movement of the pitman 138 and the actuator rack 197, rotates the corresponding selected totalizer wheel 208 in a reverse direction until such movement is stopped by the long tooth on said wheel coming into contact with the corresponding tens transfer pawl to zeroize said wheel and to position the actuator rack 197 and the pitman 138 in accordance therewith, which positioning is transmitted by the segment 158 to the printing sector 161. Operation of the printing sector 161 records the value of the amount aken from the totalizer wheel upon the record material supported by the platen roll. In total operations, the group totalizer framework or assembly 210 receives upward or disengaging movement prior to return movement of the actuator rack 197, and consequently the wheel 208 remains in a zeroized condition. In sub-total operations, the corresponding wheel 208 remains in engagement with the rack 197 during its return movement, and is restored to its original condition, after which disengaging movement is imparted to the assembly 210 to disengage said wheel 208 from said rack 197.

Normal sub-total and total operations are performed in the balance totalizer 205 in exactly the same manner as explained in connection with the group totalizer 210. In overdraft sub-total and total operations, lateral shifting movement is imparted to the main and auxiliary shafts 204 and 207 (Fig. 8B) to move the main wheel 202 out of alinement with the actuator 197 and to simultaneously move its companion auxiliary wheel 203 into alinement with said actuator. The auxiliary wheel 203 is then engaged with the actuator 197, prior to its initial movement in a rearward direction, which movement rotates said wheel in a subtractive direction and simultaneously rotates the companion wheel 202 in an additive direction until said wheels are stopped in a position corresponding to zero by a fixed stop, which is brought into alinement with said wheel 202 when it is shifted out of alinement with the actuator 197. This causes the actuator 197 and the corresponding printing sector 161 to be positioned in accordance with the true negative balance on the corresponding wheel 202 of the balance totalizer. However, when this type of balance totalizer changes from a positive to an overdrawn condition or vice versa, the units wheel 202 is incorrect by one digit, and this must be corrected by the entering of a digit, often referred to as a "Fugitive 1." The "Fugitive 1" is entered subtractively in the units wheel 202 of the balance totalizer, when the highest order wheel 202 passes through zero, while traveling in a subtractive direction, that is, changes from a positive to an overdrawn condition. When the highest order balance totalizer wheel 202 passes through zero while traveling in an additive direction, that is, changes from an overdrawn condition back to a positive condition, the "Fugitive 1" is entered additively in the units wheel 202 to correct the error of one digit in said wheel.

In overdraft sub-total operations, the auxiliary wheel 203 remains in engagement with the actuator 197 during its forward or return movement to restore the companion main wheel 202 to its original condition, and in overdraft total operations, sometimes referred to as "Credit Balance Operations," the auxiliary wheel 203 is disengaged from the actuator 197 after said actuator has completed its rearward movement and prior to its return movement, and consequently said wheel and its companion main wheel 202 remain in a zeroized condition.

A single tens transfer mechanism is used for all of the sets of totalizer wheels 208 of the group totalizer assembly 210 (Fig. 8B), said totalizer wheels being operatively alined with said transfer mechanism when they are shifted into alinement with the actuators 197. The tens transfer mechanism is normally in adding position, in which tens digits are entered additively in higher orders when the adjacent lower order wheel passes through zero, while being rotated additively by the corresponding actuator rack 197. Selection of a group totalizer for a subtract operation causes the tens transfer mechanism to be shifted from adding position to subtracting position, and when a lower order wheel 208 is rotated by the corresponding actuator 197 in a subtractive direction through zero, a tens digit is borrowed from the adjacent higher order. In sub-total and total operations the transfer mechanism remains in adding position and the transfer tripping teeth thereon, coact with the long teeth of the selected set of totalizer wheels 208 to stop said wheels in zero position, when they are reversely rotated from preset position to zero by rearward movement of the actuator racks 197, in the manner explained before.

The balance and group totalizers disclosed herein have many general features which are similar to those of the totalizers disclosed in the United States Patent No. 2,503,865, issued April 11, 1950, to R. A. Christian, to which reference may be had for a more detailed description of mechanism described only in a general way herein.

A novel mechanism is provided for selectively shifting the group totalizer line 209 horizontally with respect to the amount actuators 197 to selectively aline any desired set of totalizer wheels 208 thereon with said amount actuators. A similar mechanism is provided for shifting the main and auxiliary balance totalizer lines 204 and 207 horizontally with respect to the amount actuators 197, to aline either the main wheels 202 or the auxiliary wheels 203 with said actuators, depending upon the algebraic condition of said balance totalizer. The totalizer selecting mechanism is not pertinent to the present invention and for that reason is not disclosed herein. However, a full disclosure of the selecting mechanism is provided in the Christian et al. application, Serial Number 466,292, which may be referred to if a more complete explanation of said selecting mechanism is desired.

*Switch mechanism for tape recorder device*

The present machine is provided with an electrically operated and controlled tape recording device 49 (Fig. 1) for recording data set up on the amount actuators 197 (Fig. 8B) upon the web of a tape carried by said device. In this case the amount actuators 197, which are positioned under control of the amount keys 97 (Fig. 8A) in adding and subtracting operations, and under control of the selected set of totalizer wheels in sub-total and total-taking operations, serve as a memory or storage device for momentarily retaining the data to be transmitted to the tape of the recording device, and serve while so positioned to control the operation of an unusual switch mechanism which transmits electrically the positioning of said actuators to the recording device.

The machine chosen to illustrate the present invention, as at present constructed, is provided with ten amount banks 97, similar to that disclosed in Figs. 8A and 8B, each of which is provided with one of the amount differential actuators 197, having teeth 201 on the upper edge thereof, which in addition to coacting with the selected totalizer wheels, also coacts with a corresponding switch controlling gear 215 (Figs. 15, 19 and 23) integral with a sleeve 216 free on a rod 217, extending between and supported by right and left plates 218 and 219, and a center plate 220, said plates being secured to the sub base 198 (Fig. 8B). Extending between the plates 218, 219 and 220, and supported thereby, are rods 221 and 222, similar to the rod 217, said rods being secured longitudinally by means of nuts 225, which engage the threaded ends thereof. The plates 218, 219 and 220 further support rectangular bars 223 and 224, properly spaced apart by three cross members which are in turn secured to the corresponding plates 218, 219 and 220. Also secured to the sleeve 216 (Figs. 8B, 15, 19 and 23) in fixed relationship to the corresponding gear 215, and to each other, are eight control disks 226, said disks, said sleeve and said gear, forming a cluster, which is rotatably supported on the rod 217, and secured against longitudinal displacement by means of spring clips 227 on each side thereof, which engage corresponding annular grooves in the rod 217. There is one of the clusters, comprising the gear 215 and the eight disks 226 for each amount bank, properly spaced along the rod 217 (Fig. 19) and held in place by the spring clips 227, in cooperation with corresponding annular grooves in said rod.

By referring to Fig. 23, which is a chart giving in diagrammatic form the arrangement of the control disks 226 for one order, it will be seen that each denominational group of eight disks 226 are identified by the letters A to H, beginning with the righthand disk. Every other disk 226, beginning with A disk, and continuing with C, E and G, has a series of sensing lugs or teeth 228, which coact with a downwardly extending sensing finger on a corresponding sensing plunger 229 (Figs. 15, 16, 17 and 19), and every other disk beginning with B, and continuing with D, F, and H, has similar sensing lugs or teeth 230, which coact with a downwardly extending sensing finger on a corresponding sensing plunger 231.

The plungers 229 and 231 are slidably supported in a shiftable framework by means of parallel finished surfaces on the upper ends thereof, which fit snugly between rods 233, and by means of slots in the lower ends thereof, which snugly engage a rod 234. The rods 233 and 234 extend between a series of similar plates 235, each of which has a slot 236 which engages a corresponding annular groove in the rod 221, and each of which has a finished surface 237 near the upper edge thereof, which engages a corresponding annular groove in the rod 222 to form a framework, which is shiftable angularly between the rods 221 and 222, and which slidably supports the sensing plungers 229 and 231. As stated above, there are eight of the sensing plungers 229 and 331 for each denominational order, and these eight plungers are arranged in short and long pairs, as shown in Fig. 16, so as to coact properly with the switches which they operate, as will be explained later. Tensioned between each plunger 229 and 231 and a corresponding stud carried by the corresponding plate 235, is a spring 239, arranged to normally urge said plungers downwardly to maintain the ends of the slots in the lower ends thereof in yielding engagement with the rod 234, as shown here. Each plunger 229 and 231 is provided with two similar opposed latching projections 240 (Figs. 15 and 16) which cooperate with two similar retaining pawls 241 each rotatably mounted on a stud 242 extending between the plates 235, said pawls being urged inwardly by their respective torsion springs 243, to yieldingly engage the latching projections 240, as shown here. There are two of the pawls 241 for each denominational order, which pawls coact with the corresponding opposed projections 240 on the eight plungers 229 and 231 for each of said orders.

*Switch framework shifting mechanism*

The switch framework comprising the plates 235 and rods 233 and 234 is shiftable first downwardly and then upwardly to set the sensing plungers 229 and 231 according to the positioning of the control disks 226 by the corresponding amount actuators 197, by mechanism now to be described.

It will be observed by referring to Figs. 15 and 19 that the control disks 226 and their corresponding sensing plungers 229 and 231 are arranged in two general groups, including a righthand group of seven denominational orders and a lefthand group of three denominational orders, and that the plates 235 for each group have extending therethrough a rod 244 engaged by a series of cranks 245 secured on a shaft 246 journaled in the plates 218, 219 and 220. Secured on the lefthand end of the shaft 246 (Figs. 19 and 24) is an arm 247 pivotally connected by a link 248 to an arm 249 secured on a short shaft 250 supported between the parallel arms of a bracket 251, in turn secured to the bottom surface of the base 52. Also fast on the shaft 250 is an arm 252 pivotally connected by a link 253 to the lower end of a cam lever 254 pivoted on a shaft 255 supported between the parallel arms of a bracket 256 secured to the lower surface of the base 52. The lever 254 carries rollers 257 and 258, which coact respectively, with companion plate cams 259 and 260 secured on a secondary cam shaft 261 journaled between the parallel side members of the bracket 256.

Secured on the shaft 261 (Figs. 8A, 9 and 14) is a disk 263 carrying a stud 264, which pivotally supports a clutch pawl 265 urged clockwise by a spring 267 (Fig. 9) to cause a tooth 268 of said pawl to normally engage a clutch cut 269 in a flanged portion of a hub 270 free on the shaft 261. Secured to the hub 270 is a gear 271, which meshes with a companion gear 272 secured on the main cam shaft 185, which, as previously explained, makes one clockwise revolution, as viewed in Fig. 8A, and one such counter clockwise revolution as viewed in Fig. 9, to operate the mechanism of the accounting machine. When the tooth 268 of the clutch pawl 265 engages the clutch cut 269, counter clockwise rotation of the main cam shaft 185 and the gear 272 rotates the gear 271, hub 270, pawl 265, disk 263, and shaft 261, in unison therewith, one revolution in a clockwise direction to operate the switch mechanism for the tape recording device.

The pawl 265 (Fig. 9) has an upwardly extending finger 273, which coacts with a stud 274 in the rearward arm of a lever 275 free on the shaft 255. A link 276 pivotally connects the lever 275 to a control slide 277, mounted for horizontal shifting movement upon fixed studs 278 (Figs. 9 and 10). An upward hook-shaped extension on the rearward end of the slide 277 has a slot which engages a stud 279 in a downward extension of a lever 280 free on a rod 1281 supported in the machine framework. An upward extension of the lever 280 has pivotally connected thereto the forward end of a pitman 281, having a slot 282 which slidably engages a stud 283 secured in the machine framework, to shiftably support said pitman 281. The rearward end of the pitman 281 has a control surface 284, which coacts with an extension 285 of a sensing finger 286 free on a rod 287 supported by the machine framework. Also free on the rod 287 is an arm 288, which is flexibly connected to the finger 286 by a spring 289 tensioned between said finger and said arm, which spring urges said parts in opposite directions to normally maintain a stud 290 carried by said finger 286, in yielding contact with a shoulder formed on the arm 288. A slot in the arm 288 engages a stud 291 in one arm of a lever 292 free on a rod 293 supported by the machine framework. A spring 297 urges the arm 288 counter clockwise (Fig. 9) and the lever 292 clockwise to normally maintain a forward extension of said lever in yielding contact with the lefthand end of a lever 294 free on a stud 296 (Fig. 11) carried by the machine framework. A righthand extension of the lever 294 is pivotally connected to the lower end of a corresponding one of the sensing fingers 75, mounted for vertical shifting movement in the machine framework, the upper end of said finger arranged to coact with a corresponding one of the control plates 74, mounted in the stops 73. A spring 298 urges the lever 294 counter clockwise (Fig. 11) to normally maintain a prominent surface on the lower edge thereof in yielding engagement with the upper end of an operating slide 299, mounted in the machine framework and arranged to be operated first downwardly and then back to normal position by mechanism not shown but fully disclosed in the Christian Patent No. 2,626,749.

Initial movement downwardly of the slide 299, and concert counter clockwise movement of the lever 294, under influence of the spring 298, causes the finger 75 to sense the control surface of the plate 74, to position said finger, said lever 294, the lever 292 (Fig. 9), and the arm 288, in accordance therewith. The arm 288 in turn positions the finger 286 and the extension 285 in relation to the control surface 284 on the pitman 281, in accordance with the length of the downwardly extending portion of the control surface on the plate 74. During positioning of the finger 286, the pitman 281, lever 280 and slide 277 are positioned in their normal or home position, as shown in dot and dash lines in Fig. 9, in which position the control surface 284 is out of the path of the extension 285, and therefore does not interfere with positioning of said finger 286. A spring 303 (Fig. 9) urges the slide 277 forwardly and the lever 280 counter clockwise to normally maintain said lever in yielding contact with an operating rod 300, mounted between the side arms of a yoke 301 conected by a link 302 to a lever (not shown) which coacts with a cam (not shown) on the main cam line 185, which cam, during rotation of said main cam line shifts the link and the yoke 301 first downwardly, or counter clockwise, and then upwardly to normal position. The spring 303 causes the lever 280 and the slide 277 to move in unison with the rod 300, in a counter clockwise and forward direction, respectively, which movement of said lever 280 shifts the pitman 281 rearwardly to cause the control surface 284 to sense for the extension 285, to position said pitman, the lever 280 and the slide 277 in accordance with the positioning of the finger 286, under control of the plate 74 (Fig 11).

When the longest or T length control plate 74 is in position to be sensed by the finger 75, as shown in Fig.11, the lever 294 and the extension 285 of the finger 286 are positioned, as shown in Fig. 9 so that said extension is opposite a notched portion 304 of the control surface 284. This permits full movement rearwardly of the pitman 281 from home position, as shown in dot and dash lines, to the position shown in full lines, said lever 280 in turn positioning the slide 277 in its extreme forward position, as shown here in full lines, under influence of the spring 303, as explained above. This forward positioning of the slide 277, through the link 276 (Fig. 9) rocks the lever 275 clockwise to move the stud 274 above and out of the path of the finger 273, and consequently the tooth 268 of the pawl 265 is free to engage the clutch cut 269 in the flange of the hub 270 to operatively connect the disk 263 and the secondary cam shaft 261 to the gear 271, so that said shaft will be driven one clockwise revolution in unison with said gear 271 by the gear 272 and the main cam shaft, as explained before.

Near the end of machine operation, return movement upwardly of the link 302, the yoke 301, and the rod 300 (Fig. 9) causes said rod to restore the lever 280 upwardly or clockwise in unison therewith, to shift the slide 277 rearwardly to home position against the action of the spring 303. This restoring rearwardly of the slide 277, through the link 276, rocks the lever 275 counter clockwise to move the stud 274 into the path of the finger 273, which is the normal position of said parts. Any carriage stop 73 (Fig. 11) having a control plate 74, which is shorter than the T length plate (here shown), will position the extension 285 (Fig. 9) of the finger 286 in the path of the arcuate control surface 284 to obstruct movement of the pitman 281, arm 280, slide 277, and lever 275, to retain said lever 275 in its normal position, in which the stud 274 is in the path of the finger 273. Consequently in this instance the tooth 268 of the pawl 265 will be held out of engagement with the clutch cut 269, and therefore no movement will be imparted to the disk 263 and the shaft 261, and as a result the switch mechanism for the tape recorder device will be rendered inoperative.

From the above description it should be understood that operation of the tape recording mechanism is under control of the traveling carriage in pre-selected columnar positions thereof, and that a T length control plate 74 (Fig. 11) must be in position to coact with the sensing finger 75 if the tape recording mechanism is to be rendered operative.

The position in which the tooth of the pawl 265 is engaged with and disengaged from the clutch cut in the hub of the gear 271 is approximately 70 degrees beyond the home position of said clutch cut and said gear. Consequently the pawl 265 remains in engagement with the clutch cut when the gear 271 arrives at home position, as shown in dot and dash lines (Fig. 9) and is not restored to its normal 70 degree position until in the early part of the succeeding operation. If, in the succeeding operation, the arm 275 and stud 274 are positioned by other than a full or T length control plate 74 (Fig. 11) the finger 273 will engage said stud to disengage the tooth of the pawl 265 from the clutch cut 269 to render the tape recorder switch mechanism inoperative. After the tooth of the pawl 265 is disengaged, in the manner explained above, the disk 263 and shaft 261 are retained in normal 70 degree position by means of a homing notch 305 in the periphery of said disk, in cooperation with a roller 306, carried by an arm 307 free on the shaft 255, said arm being urged counter clockwise by a spring 308 to cause said roller to yieldingly engage said notch.

In addition to the control of the tape recorder switch mechanism by the traveling carriage, in columnar positions thereof, as explained above, said device may also be controlled by the Void key 123 (Figs. 1, 3, 5 and 10), depression of which moves a square stud 309 in a forward extension of the lower end thereof into the path of an upward projection 310 on the forward end of the slide 277, to obstruct initial movement forwardly of said slide, and thus to retain it in normal position, as shown here, in which the stud 274 (Fig. 9) is retained in the path of the finger 273, to disengage the pawl 265 and thereby render the tape recorder switch mechanism inoperative in the manner explained above.

Referring now to Figs. 14 and 24, the cams 259 and 260 for imparting shifting movement to the tape recorder switch framework operate in unison with the secondary cam shaft 261, and consequently are effective only when said shaft is rotated through the medium of the clutch mechanism described in connection with Fig. 9. Initial movement clockwise of the shaft 261 and cams 259 and 260 rocks the lever 254 first counter clockwise, which through the link 253 imparts similar movement to the arm 252, shaft 250 and arm 249, to in turn shift the link 248 downwardly. Downward movement of the link 248 rocks the arm 247, shaft 246, and cranks 245 counter clockwise as viewed in Fig. 24, and clockwise as viewed in Figs. 15 and 16, to shift the switch framework comprising the plates 235 and rods 233 and 234 downwardly, and said framework in turn carries the sensing plungers 229 and 231 downwardly in unison therewith, to cause said plungers to sense respectively for the teeth 228 and 230 (Fig. 23) on the control disks 226. If the teeth 228 and 230 are located in the path of the lower ends of the respective plungers 229 and 231, downward movement of said plungers, in unison with the switch framework 235, will be obstructed, and said plungers will be displaced upwardly in relation to said framework, against the action of the springs 239. The framework 235 continues its downward movement, independently of the obstructed plungers 229 and 231, causing the teeth of the pawls 241 to ride over the rounded humps of the projections 240, and engage shoulders 311 (Figs. 15 and 16) formed by said projections, to retain said plungers in their displaced positions against the action of the springs 239.

After the plungers 229 and 231 have been displaced, according to the digits set up on the control disks 226 by the actuators 197, continued rotation of the cams 259 and 260 (Fig. 24) restores the switch framework 235 upwardly to normal position. The plungers 229 and 231 (Figs. 15, 16 and 17) have fast to the upper ends thereof switch operating blocks 312 and 313, respectively, made of suitable insulating material, and upward movement of the displaced plungers 229 and 231, in unison with the framework 235, causes the corresponding blocks 312 and 313 to engage corresponding switch blades 314 and 315, and carry them upwardly, into contact with companion switch blades 316 and 317, to complete a circuit to the tape recording device to cause the digit entered in the particular denominational order being described to be transmitted to said tape recording device. It will be noted, that the switch operating plungers 229 and 231 are arranged in alternate long and short pairs, the long pair being shown in Fig. 16 and the short pair in Fig. 15, and that the switch blades 314 to 317 inclusive are located in proper coacting relationship with their corresponding plungers and operating blocks 312 and 313, as shown here. The switch blades 314–317 (Figs. 15, 16, 17 and 19) are connected by suitable wiring (not shown) to a multiple plug-in receptacle (not shown) mounted on a bar (not shown) of U shape in turn secured to the machine base at the back thereof, said receptacle in turn arranged to be connected to the tape recording device by means of a multiple plug connector (not shown) which is engageable with said receptacle.

The pawls 241 (Figs. 15 and 16) retain the operated switch plungers 229 and 231 in operated position at the end of machine operation, and if in the succeeding machine operation different plungers are displaced, the displacing of said different plungers causes the projections 240 thereon to rock the corresponding retaining pawls 241 out of engagement with the shoulders 311 of the previously displaced plungers to free said plungers for return movement downwardly to normal position, under influence of their respective springs 239.

The chart (Fig. 23) shows the arrangement of the teeth 228 and 230 on the control disks 226 for the different digits, zero to nine inclusive, of one denominational order. As previously explained, there are eight control disks 226 for each denominational order, and these are identified in the chart by letters A to H inclusive, beginning with the righthand disk. Every second disk, beginning with the A disk 226, has the control teeth 228 thereof located to the right of the angular center line, and the remaining four disks, beginning with the B disk 226, have the teeth 230 thereof located on the left side of said angular center line. In the chart (Fig. 23) the Roman numeral I is used to indicate the high spot or tooth 228 on the right side of the center line, and the Roman numeral II is used to indicate the high spot or tooth 230 on the left side of the center line. Therefore, consulting the chart it will be apparent that zero is obtained by a tooth 228 on the E disk 226, and a tooth 230 on the F disk 226. Likewise the digit 1 is obtained by a tooth 230 on the B disk 226 and a tooth 228 on the G disk 226, and so on. From the above description, it should also be clear that the plungers 229 and 231 and the corresponding switches for each denominational order are always operated in pairs in order to send the proper numeral impulses to the tape recording device.

*Carriage controlled switch mechanism*

As explained at the beginning of this specification, the recording process, that is, the operation of the tape recording mechanism, is controlled by the traveling carriage in pre-selected columnar positions thereof, so as to permit the arranging of various programs adaptable to different business systems. A switch mechanism, similar in many respects to the amount switches explained above, is arranged at the back of the traveling carriage, and said switch mechanism is operated by adjustable stops located in preselected columnar positions of the traveling carriage for completing a circuit which permits the recording device to function, depending upon the columnar position of the traveling carriage. The carriage switch mechanism works in conjunction with the carriage controlled mechanism shown in Figs. 9 and 11, and explained above, and must be arranged to agree therewith, as will be explained more in detail presently.

Directing attention to Figs. 8A, 8B, 18 and 20, a recorder switch bar 319 is removably mounted on brackets (not shown) secured to the framework of the traveling carriage 54 at the rear thereof, in a manner similar to that in which the stop bar 72 is attached to the front of the traveling carriage. The bar 319 extends substantially the full length of the traveling carriage and has in the rearward face thereof a T-shaped slot arranged to receive T-shaped nuts 320, which in cooperation with corresponding screws 322, serve to adjustably mount a series of switch operating plates 321, along said bar in predetermined columnar positions, to agree with the business system to which the machine is being applied.

The plates 321 are divided into upper and lower sections, each having eight holes (Figs. 8B and 18) arranged to accommodate a switch operating stud 323, said stud arranged to coact with corresponding switch plungers 324, (Fig. 20) which are similar in outline and and function exactly like the amount plungers 229 and 231 (Fig. 15). Fifteen of the 16 holes in each of the plates 321 are used for controlling the tape recorder, in accordance with the columnar position of the traveling carriage, while the 16th hole is used for controlling the void control relay. As shown in Figs. 8B and 18, only one stud position is used for each columnar position of the traveling carriage, to control the functioning of the tape recorder. The plates 321 may be arranged along the length of the bar 319 to correspond with the various columnar positions of the traveling carriage and, as mentioned previously, said plates 321 must be arranged in agreement with the location of the carriage control stops 73 on the bar 72 (Fig. 8A) and it is therefore evident that if it is desired to change the program of the machine, it is necessary to replace both the front bar 72 and the rear bar 319 with other related bars, which are arranged for the desired program or system.

The plungers 324 are slidably mounted in a shiftable framework in exactly the same manner as the amount plungers 229 and 231. Each of the plungers 324 has an enlarged rearward end with parallel surfaces which fit snugly between rods 325, while the forward ends of said plungers are slotted to snugly embrace a rod 326, said rods 325 and 326 extending between upper and lower switch frame plates 327 and 328 (Figs. 20 and 21) to form a shiftable framework for supporting said plungers 324. It will be noticed that the enlarged rearward ends of the plungers 324 fit snugly in corresponding annular grooves in the rods 325 and that the slotted forward ends of said plungers fit snugly in corresponding annular grooves in the rod 326 to properly side-space said plungers. The switch plunger supporting framework is shiftably mounted, by means of the lefthand edges (Figs. 20 and 21) of the plates 327 and 328, in cooperation with corresponding annular grooves in a stud 329, and by means of slots 330 in the righthand forward edges of said plates, in cooperation with corresponding annular grooves in a stud 331. The studs 329 and 331 are secured in a switch assembly support plate 332, the forward edge of which is secured to the plate 68 (Fig. 8B) and a rearward extension 333 of which is secured by screws to a bent-over portion of a bracket 334 secured to the center plate 220 (Fig. 15).

As previously explained, the switch operating plungers 324 are similar to the amount plungers 229 and 231 in appearance and in operation, and each of said plungers 324 is urged inwardly by a corresponding spring 336 to normally maintain the bottom of the slot in the inner end thereof in yielding engagement with the rod 326, as shown in Fig. 20. The plungers 324 are retained in displaced position by two retaining pawls 337, mounted opposite each other on studs 339, extending between the plates 327 and 328 (Fig. 21) and said pawls are urged inwardly by corresponding torsion springs 340 to normally maintain the teeth thereof in yielding engagement with two similar retaining projections 338, formed opposite each other on each of said plungers 324. Each of the plungers 324 (Fig. 20) has a block 341 of suitable insulating material, integral with the outer or rearward ends thereof, for engaging the corresponding switch blades 342 and 343, and moving said switch blades into engagement with companion blades 344 and 345 to complete a circuit for controlling the operation of the tape recorder, in accordance with the columnar position of the traveling carriage. The blades 342–345 are properly mounted in an upwardly extending portion of a bracket 346 secured to the upper surface of the plate 332. The carriage-actuated switch mechanism shown in Fig. 20 is enclosed in a cover 347, which is removably attached to the top surface of the plate 332 by means of screws 348.

The plate 328 (Figs. 20 and 21) carries a stud 349 freely engaged by a hole in the inner end of an arm 350 secured on a short vertical shaft 351 rotatably supported in a bushing secured in the plate 332. Also secured on the shaft 351 is a crank 352 connected by a wire link 353 to a crank 354 (Figs. 15 and 24) in turn secured on the shaft 246 which, as previously explained, imparts inward and outward shifting movement to the framework 235 for the amount plungers 229 and 231. It will be recalled that, the shaft 246 receives its movement from the shaft 261 which functions only when the tape recording device is activated by the mechanism shown in Fig. 9. Initial movement of the shaft 246 shifts the link 353 rearwardly, which in turn rocks the crank 352, shaft 351, and arm 350 clockwise (Fig. 20) to shift the framework carrying the plungers 324 inwardly. Initial movement inwardly of the plunger framework causes the stud 323 located in effective or sensing position, to be engaged by the corresponding plunger 324 to displace said plunger outwardly with respect to its framework. Displacing of the plunger 324 causes the projections 338 thereon to ride past the teeth of the pawls 337, whereupon said pawls are spring-returned inwardly into engaging relationship with shoulders formed by said projections, to retain said plunger in its displaced condition. Return movement of the shaft 246 restores the framework for the plungers 324 outwardly, causing the block 341 on the displaced plunger to engage the blade 342 of the corresponding switch and move said blade into contact with its companion blade 344 to complete a circuit to control the tape recording device in accordance with the columnar position of the traveling carriage. It should be remembered that only one of the plungers 324 functions for each columnar position of the traveling carriage. However, like the amount plungers 229 and 231 (Figs. 15 and 16), these plungers are arranged in long and short pairs, which coact with their corresponding switch blades 342–345 in exactly the same manner as explained in connection with said amount plungers.

Referring to Figs. 8B and 20, the bar 319 is slidably supported between vertically alined rollers 430 and 431 free on studs in an upright portion of an angle-bracket 432 secured to the upper surface of the plate 332. Opposed flanges on the rollers 430 and 431 engage corresponding linear grooves in the upper and lower surfaces of the bar 319 to prevent flexing of said bar when the effective plunger 324 is being displaced by the corresponding stud 323. It will be noted that the rollers 430 and 431 (Fig. 20) are located directly opposite the switch plungers 324 and serve to reinforce the comparatively long bar 319 against flexing and strain at the point where said plungers engage and are displaced by the studs 323.

Like the amount switch blades 314–317 (Fig. 15) the carriage controlled switch blades 342–345 (Fig. 20) are connected by suitable wiring to a multiple plug-in receptacle (not shown) mounted on the U bar located at the rear of the machine. The receptacle is engageable by a multiple plug connector (not shown) connected by suitable wiring to the tape recording device.

Instead of relying upon the projections 338 (Figs. 20, 21 and 22) of the plunger 324 being displaced to rock the pawls 337 outwardly to relase any previously displaced plunger, a pawl disengaging plate 1354 is provided for assisting in the disengaging of said pawls. The plate 1354 is shiftably supported in the plunger framework in exactly the same manner as the plungers 324, by means of parallel surfaces formed on the rearward end thereof, in cooperation with corresponding annular grooves in the studs 325, and by means of a slot in the forward end thereof, which engages a corresponding annular groove in the stud 326. A spring 355 urges the plate 1354 inwardly to normally maintain the bottom of the slot in the inner end thereof in yielding engagement with the stud 326, as shown in Fig. 22.

Initial movement inwardly of the framework for the plungers 324, including the plate 328, carries the plate 1354 inwardly in unison therewith until an arcuate shoulder 356 formed on said plate, engages the tooth of a plate control pawl 357 rotatably supported on a stud 358 secured in the plate 332 (Figs. 20 and 22). This terminates inward movement of the plate 1354, causing two similar opposed angular camming surfaces 360 thereon, in cooperation with the teeth of the pawls 337, to urge said pawls outwardly, out of engagement with the projections 338 on the previously displaced plunger 324. Disengaging of the pawls 337 frees the previously displaced plunger 324 and permits it to be restored inwardly by its spring 336. Continued inward movement of the framework, including the plate 328, causes a stud 361, secured in an extension of said plate, to engage the pawl 357 and rock said pawl clockwise (Fig. 22) against the action of a spring 359. Clockwise movement of the pawl 357 disengages the tooth thereon from the arcuate shoulder 356 to free the plate 1354 for restoration inwardly by the spring 355 to normal position. Restoring of the plate 1354 frees the pawls 337 to the action of their springs 340 (Figs. 20 and 22), which restores said pawls to normal position where they yieldingly engage the projections 338 of the plungers 324. The pawls 337 become effective in ample time to engage the shoulders formed by the projections 338 of the plunger 324 being displaced in the present operation to retain said plunger in displaced position for operation of the corresponding switch blades, upon return movement outwardly of the plunger framework. As was partially explained before, the plate 1354 is provided for assisting the plunger 324 being displaced in moving the pawls 337 outwardly against the action of their springs 340, to insure that any previously displaced plunger 324 is released and restored inwardly prior to the displacing of another plunger, and, as said plungers 324 are used singly, to relieve them of possible excessive strain in connection with disengaging said pawls 337.

*Tape recorder control switch*

The switch mechanism shown best in Figs. 13 and 14 is provided for insuring that operation of the tape recorder starts at the proper time during the machine cycle, which proper time is, immediately after the amount actuators have received their full extent of initial movement in a rearward direction, to be positioned, either by the depressed amount keys in adding and subtracting operations, or by the wheels of the selected totalizer in sub-total and total-taking operations.

Secured on the secondary cam shaft 261 which, as previously explained, operates only when the tape recording mechanism functions, is a plate cam 363, which coacts with a roller 364 carried by a lever 365 pivoted on the shaft 255 and urged clockwise by a spring 370, to normally maintain said roller in yielding contact with the periphery of said cam. When the clutch mechanism for the shaft 261 is effective it causes said shaft and the cam 363 to be rotated by the mechanism shown in Fig. 9, in the manner explained earlier. After the cam 363 has moved 220 degrees beyond home position, to provide ample time for the amount actuators 197 to complete their initial movements rearwardly, said cam cooperating with the roller 364, rocks the lever 365 counter clockwise against the action of its spring 370. Counter clockwise movement of the lever 365 causes a block 366 fast on a downward extension thereof and formed of suitable insulating material, to engage a flexible spring blade 367, and carry a contact on the lower end of said blade into engagement with a similar contact on a companion blade 368 to complete a circuit to the tape recording unit to cause the recording process to be started therein at the right stage of operation of the mechanical portion of the accounting machine. Near the end of machine operation the cam 363 permits the spring 370 to restore the lever 365 clockwise to open the switch blades 367 and 368 to interrupt the flow of current to the tape recorder and thus terminate its operation. The switch blades 367 and 368 are mounted on a bar 369, bent-over portions of which are connected to the side plates of the bracket 256, as shown in Figs. 12 and 13.

*Lock-up solenoid*

Figures 5, 6, 7:
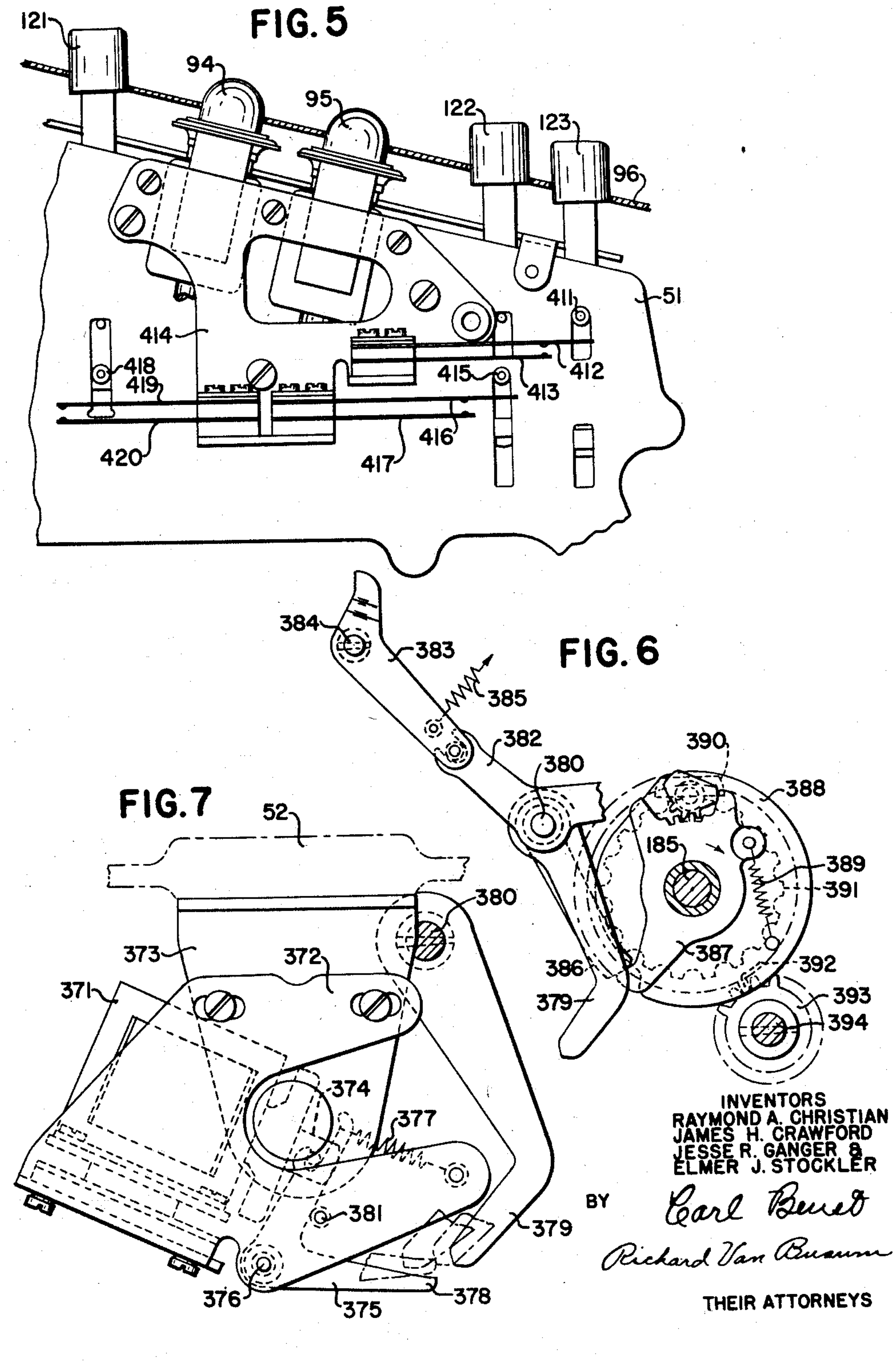
Fig. 5 is a left side elevation of certain of the control keys and two signal lights for controlling and indicating certain functions of the machine.
Fig. 6 is a right side elevation of a portion of the machine releasing mechanism.
Fig. 7 is a right side elevation of a solenoid and connected mechanism for controlling the releasing of the machine for operation, under certain conditions.

A lock-up solenoid 371 (Fig. 7) is provided for locking the machine against release while the recording process is taking place in the tape recording unit. The solenoid 371 is secured to a bracket 372, in turn secured to a hanger 373 fastened to the bottom surface of the machine base 52. The solenoid 371 has a shiftable armature 374 carrying a pin which engages a slot in an upward extension of a lever 375 free on a stud 376 secured in the bracket 372. A spring 377, connected between the lever 375 and the bracket 372, urges said lever clockwise (Fig. 7) to the position here shown, to normally maintain the upward extension of said lever in yielding contact with a stop stud 381 fast in the bracket 372. A rearwardly extending finger 378 of the lever 375 is arranged to cooperate with the toe of a foot-shaped extension of an arm 379 secured on a release shaft 380 journaled in the machine framework. Secured on the shaft 380 is a release lever 382, having a slot which engages a stud in the downward end of a lever 383 secured on a shaft 384 journaled in the machine framework. Also secured on the shaft 384 is an arm (not shown) connected to a release slide (not shown), which is normally retained in unreleased position against the action of a spring 385, by a normally effective latch mechanism (not shown). The latch mechanism may be unlatched by depression of any one of the starting bars 100, 101, or 102 (Fig. 1) or other so-called "motorized keys," or by means of the traveling carriage in preselected columnar positions thereof, to free the lever 383. Freeing of the lever 383 (Fig. 6) to the action of the spring 385, permits said spring to rock said lever counter clockwise, to in turn rock the lever 382, shaft 380, arm 379, and a clutch release arm 386, also fast on said shaft 380, clockwise. Clockwise movement of the arm 386 moves the lower end thereof out of the path of the foot-shaped extension of a clutch operating arm 387 free on the hub of a disk 388 secured to the main cam shaft 185. Freeing of the arm 387 permits a spring 389 to rock said arm clockwise (Fig. 6) to engage a clutch dog 390 mounted for rotation in the disk 388, with one of a series of notches in the periphery of a machine operating drum 391 free on the shaft 185. Integral with the drum 391 is a gear 392, which meshes with a pinion 393 secured on a shaft 394 journaled in the machine framework, said shaft being operatively connected to the operating motor and driven continuously thereby in a counter clockwise direction (Fig. 6). The gear 392 drives the disk 388 and main cam shaft 185 clockwise to operate the mechanism of the accounting machine in the usual and well known manner, and after said disk and said shaft have completed approximately one revolution, the arm 386 and connected mechanism are restored counter clockwise to move said arm into the path of the foot-shaped extension of the arm 387. Engagement of the arm 387 with the arm 386 disengages the dog 390 from the drum 391 to terminate operation of the machine, after the main cam shaft has completed one clockwise revolution, which is required for each accounting machine operation. Restoring of the arm 386, and connected mechanism, counter clockwise, causes the latch mechanism to again become effective to retain said parts in their restored condition until the machine is again released for operation. The usual non-repeat device is provided for preventing repeat operations of the machine in case one of the starting bars is retained depressed at the end of a machine cycle.

It will be recalled that the operation of the tape recording unit is controlled by a Master Recorder switch 156 (Fig. 1), which, when in "Off" position, disables the tape recording mechanism and permits the accounting machine to be used independently thereof. Moving the Master switch to "On" position renders effective the tape recording mechanism for use in connection with the accounting machine. When the Master switch 156 is in "Off" position the solenoid 371 is deenergized or ineffective, and consequently remains in the position shown in Fig. 7, in which the finger 378 is below and out of the path of the toe of the foot-shaped extension of the lever 379 and therefore does not interfere with normal release of the machine for operation. Moving the Master Recorder switch 156 to "On" position permits current to flow to the solenoid 371, and at the same time activates a relay which deenergizes said solenoid 371 to permit the accounting machine to be released for operation, to set up data to be entered in the tape recording unit. At about the same time in the machine cycle (220 degrees) that the recorder control switch mechanism, shown in Fig. 13 and explained above, functions to close the contacts of the blades 367 and 368, the solenoid 371 is energized, and as the arm 379 is in its clockwise position, that is, has not been restored to unreleased position, the finger 378 comes into yielding contact with the toe of the foot-shaped extension of said arm 379 and remains thus until said arm is restored near the end of machine operation. After the arm 379 is restored the finger 378 moves into the path of the toe of said arm, as shown in dot-and-dash lines, to obstruct releasing movement thereof, and thus prevent operation of the machine. After the recording process has been completed, to record on the tape all the data set up on the accounting machine, the solenoid 371 is deenergized to permit releasing movement of the arm 379. From the foregoing it should be clear that the lock-up solenoid 371 functions to prevent release of the accounting machine for a subsequent operation until after the recording process has been completed and all the data recorded on the tape.

The accounting machine releasing mechanism described in a general way above is fully disclosed in connection with Figs. 123 and 129, and the description associated therewith in the Christian et al. Patent No. 2,626,749, to which reference may be had if a more detailed description is desired of this mechanism.

*Void control switch mechanism*

As previously explained, the Void key 123 (Figs. 1 and 3) is used in the correction of errors, and after an error has been detected, the Void key is depressed to cause operation of the recording unit to be immediately stopped so that the error may be corrected. The operation of the void control mechanism, under influence of the key 123, is controlled by the switch mechanism shown in Figs. 12 and 14, and includes a cam 395, which is secured to the sleeve 270 in fixed relationship to the gear 271, which meshes with the gear 272, in turn secured to the main cam shaft 185 (Fig. 9) and driven thereby one clockwise revolution (Fig. 12) each machine operation. The periphery of the cam 395 coacts with a roller 396 carried by a lever 397 free on the shaft 255, and urged clockwise by a spring 398, to normally maintain said roller in yielding contact with the periphery of said cam 395. Rotation of the cam 395, in cooperation with the roller 396, rocks the lever 397 counter clockwise, against the action of the spring 398, causing a block 399, made of suitable insulating material and fast to the lower end of said lever 397, to engage a switch blade 400 and move the contact of said blade into engagement with a similar contact on a companion switch blade 401, to complete a circuit which renders the void control mechanism effective, so that errors may be corrected by depression of the Void key 123, as explained before.

By comparing the void control cam 395 with the recorder control switch cam 363 (Figs. 12 and 13) it will be seen that the void control switch 400—401 is closed to render the void control mechanism effective during the time that the recorder control switch 367—368 is closed, and therefore said void control mechanism may function only when the recorder mechanism is rendered effective by said switch 367—368.

*Void counter*

A step-by-step or increment counter 409 (Figs. 1 and 2) is provided for counting the number of void operations performed in connection with the tape recording mechanism, and this void counter is actuated to count one each time the Void key 123 is depressed. A void counter operating solenoid 402 is mounted on a bracket 403 secured to a plate 404, in turn secured to the machine base 52. The solenoid 402 has a shiftable armature 405 carrying a pin which engages a slot in a downward extension of a lever 406 free on a stud 407 fast in the plate 404. A slot in the upper end of the lever 406 engages a stud 408 in the feed pawl supporting yoke for the void counter 409. A spring 410 urges the lever 406 clockwise to normally retain the feed pawl for the counter 409 in retracted or take-up position. Depressing the Void key 123 (Fig. 5) causes an insulated roller 411 carried thereby, to engage a switch blade 412, and carry a contact on said blade into engagement with a similar contact on a companion blade 413 to complete a circuit to control the operation of the tape recording mechanism in void operations and to simultaneously energize the solenoid 402 (Fig. 2). Operation of the armature 405 rocks the lever 406 counter clockwise, against the action of the spring 410, to operate the feed pawl for the void counter 409, to cause the units wheel of said counter to be advanced one step or one digit to keep an accurate count of the number of void operations performed. The wheels of the void counter 409 are visible through a corresponding opening in the keyboard plate 96, and said counter 409 is provided with a resetting wheel for manually resetting the counter wheels to zero whenever required. The switch blades 412 and 413 (Fig. 5) are properly mounted on an ear bent outwardly from a plate 414, in turn secured to the left side frame 51.

*Symbol, reverse and overdraft control*

In some applications it may be desirable to especially label or symbolize the data from a particular item so that it may be processed later in one of two or more distinct ways. For this purpose the "S" key 122 (Fig. 1, 3 and 5) has been provided, and when depressed, causes an insulated roller 415, carried thereby, to engage an extension of a spring switch blade 416, and carry a contact on said blade into engagement with a similar contact on a companion spring blade 417, to complete a circuit, which, through proper electrical controls, causes a distinguishing symbol to be recorded on the tape, so that said data from a particular item may be readily identified.

The "R" or Reverse key 121 (Figs. 1, 3 and 5) is provided for reversing the add and subtract operation of totalizers, and may be used in the present machine in lieu of the void control mechanism, for correcting errors which are not discovered until after the recording process or operation has been completed, and in other instances, such reverse operations may be used during normal operation of the machine. Depressing the "R" key 121 (Fig. 5) causes an insulated roller 418 carried thereby, to engage a spring switch blade 419, and carry a contact on said blade into engagement with a similar contact on a companion blade 420 to complete a circuit, to reverse the add or subtract function in the recording unit and to simultaneously cause a plus or minus symbol to be recorded on the tape, to identify the type of reverse operation (add or subtract) being performed. The switch blades 416 and 417, and 419 and 420 are suitably mounted on an outwardly bent extension of the plate 414, similar to the switch blades 412 and 413.

A switch mechanism, which is operated by the shifting mechanism for the balance or overdraft totalizer, controls the recording mechanism to cause a symbol indicating the positive or negative condition of the balance totalizer to be recorded upon the tape, along with the other recordings thereon.

The shiftable balance totalizer shaft 204 (Figs. 4 and 8B) has secured near the left end thereof a shifting disk 421, the outer face of which is normally engaged by the rounded end of a stud 422 made of suitable insulating material, and secured to the lower end of a spring switch blade 423, having a contact point arranged to be engaged with a similar contact point on a companion blade 424, said blades being properly mounted on a bracket 425, in turn secured to a plate 426, secured to the machine base near the lefthand side thereof.

Figure 4:
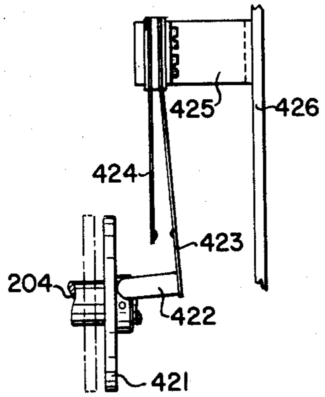
Fig. 4 is a detail view of the overdraft control switch mechanism.

When the balance totalizer is in a positive condition, the shaft 204 and disk 421 are positioned, as shown in full lines in Fig. 4, whereupon said disk, in cooperation with the stud 422, retains the blade 423 in open position, as here shown, and in this case a plus symbol will be recorded upon the tape to indicate that the balance totalizer is in a positive condition. In sub-total and total operations, if the balance totalizer is in an overdrawn or negative condition, the overdraft sensing mechanism will cause the balance totalizer shaft 204 and the disk 421 to be shifted laterally from the full line position (Fig. 4) to the dot and dash position, to cause the true negative amount of the overdraft to be recorded, as is the usual practice. Shifting of the disk 421 from full line to dot and dash line position, causes the contact point on the blade 423 to engage the contact point on the blade 424 to complete a circuit, which causes the symbol sign to be reversed so that a negative symbol will be recorded upon the tape, when said balance totalizer is in an overdrawn condition. If during the sequence of operations, in connection with a particular segment of recording work, the balance totalizer changes from an overdrawn to a positive condition, the switch blades 423 and 424 (Fig. 4) will be separated to cause a plus symbol to be recorded on the tape.

Inasmuch as the present application is directed principally to the recorder switch mechanism and the manner in which it is connected to the accounting machine differential or actuator devices, it is believed that a full understanding of the operation of said switch mechanism will have been obtained from a perusal of the preceding specification, and description of the operation of the machine in connection with a particular business system is believed unnecessary in the present instance, inasmuch as the application of the instant machine and its associated tape recording unit to a particular business system will be fully explained in a related application dealing particularly with the construction and operation of the tape recording mechanism.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the spirit and scope of the invention.

What is claimed is:

1. In a combined accounting machine and tape recording device, said accounting machine having a traveling carriage movable to various columnar positions, and having a differential actuator for each denominational order, said actuators being positionable according to various digital values, the combination of a plurality of switches for each denominational order, said switches corresponding to the various digital values; a shiftable framework; a spring-loaded operating plunger for each switch, said plungers mounted in the framework so as to be displaceable against the action of the spring load; means to retain the plungers in displaced condition; an element operatively connected to and positioned by each differential actuator; a plurality of projections on each element corresponding to the various digital values; means to shift the framework to cause the plungers to sense for and be displaced by the projections in accordance with the positioning of the differential actuators and the elements, and to cause the displaced plungers while held by the retaining means to operate the corresponding switches to transmit the digital values corresponding to the positioning of the actuators and elements to the tape recording device; a main control switch to render the tape recording device operative or inoperative; means to actuate the main control switch to control the operation of the tape recording device; common operating means for the shifting means and for the main control switch actuating means; means including a clutch device to connect the operating means to the shifting means and the control switch actuating means; and means controlled by the traveling carriage in preselected columnar positions to control the effectiveness of the clutch device to render the tape recording device operative or inoperative, depending upon the columnar position of the traveling carriage, and to control the operation of the digit switches in accordance with the columnar position of the traveling carriage.

2. In a combined accounting machine and electrically operated and controlled tape recording device, the combination of a differential actuator for each denominational order of the accounting machine, said actuators positionable to various numerical positions; a rotatable element operatively connected to and positionable by each of the differential actuators; a plurality of projections on each of the elements, said projections arranged in circular rows in such a manner that one projection in each of two of said rows corresponds to each numerical position of the corresponding differential actuator; a switch for each circular row of projections, said switches electrically connected to the tape recording device; a shiftable framework; a plunger for each switch and each corresponding row of projections, said plungers displaceably mounted in the framework between said switches and said projections; means to retain the plungers in displaced condition; and means to shift the framework in one direction to cause the plungers to engage and be displaced by the effective projections, said means also effective to shift the framework in the opposite direction to cause the displaced plungers to operate the corresponding switches to transmit numerical values corresponding to the position of the differential actuators to the tape recording device.

3. In a combined accounting machine and tape recording device, the combination of a differential actuator for the accounting machine, said actuator positionable in accordance with various digital values; an element operatively connected to the actuator and positionable thereby in accordance with various digital values; two projections on the element for each digital value, the two projections corresponding to the digital position of the differential actuator arranged to be located in effective position; two switches for each digital value, said switches connected to the tape recording device; a shiftable framework; a plunger for each switch displaceably mounted in the framework between the switches and the projections; means to retain the displaced plungers in displaced condition; and means to shift the framework in one direction to cause the plungers corresponding to the effective projections to be displaced by said projections and held displaced by the retaining means, said shifting means effective to shift the framework in the reverse direction to cause the displaced plungers to operate the corresponding switches to transmit the digital positioning of the differential actuator to the tape recording device.

4. In a combined accounting machine and tape recording device, having a differential actuator for each denominational order, said actuators positionable in accordance with various digital values, the combination of a rotatable element operatively connected to each differential actuator and positioned thereby; eight circular rows of projections on each element, one projection in each of two circular rows arranged to represent a digital value; a shiftable framework; a spring-loaded sensing plunger for each circular row of projections, said plungers mounted in the framework so as to be displaceable by the corresponding projections against the action of the spring load; means to retain the plungers in displaced condition; a switch for each plunger and operable thereby, said switches connected to the tape recording device; means to locate the differential actuators and the corresponding elements in positions corresponding to various digital values to in turn locate the two projections corresponding to the digital position of each actuator in sensing relationship with the corresponding plungers; and means to impart a first shifting movement to the framework to cause the plungers to sense for and be displaced by the effective projections, said shifting means also effective to impart a second shifting movement to the framework to cause the displaced plungers while held by the retaining means to operate the corresponding switches to transmit the digital values corresponding to the position of the differential actuators to the tape recording device.

5. In a combined accounting machine and tape recording device, said accounting machine having a traveling carriage movable to various columnar positions, the combination of a horizontally shiftable differential actuator for each denominational order of the accounting machine, said actuators positionable in accordance with various digital values; a rotatable element operatively connected to each actuator and positionable thereby; a plurality of circular rows of projections on each element, one of said projections in each of two circular rows arranged to represent a digital value; a shiftable framework; a spring-loaded sensing plunger for each circular row of projections, said plungers mounted in the framework and arranged to be displaced by the corresponding projections against the action of the spring-load; means to retain the plungers in displaced condition; a switch for each plunger and operable thereby, said switches connected to the tape recording device; means to locate the differential actuators and the corresponding elements in positions corresponding to various digital values to in turn locate the two projections corresponding to the position of each actuator in sensing relationship with the corresponding plungers; means to impart a first shifting movement to the framework to cause the plungers to sense for and be displaced by the effective projections, said shifting means also effective to impart a second shifting movement to the framework to cause the displaced plungers while held by the retaining means to operate the corresponding switches to transmit the digital values corresponding to the position of the differential actuators to the tape recording device; means to operate the shifting means; means including a clutch to connect the operating means to the shifting means; and means rendered effective by the traveling carriage in preselected columnar positions to control the operation of the clutch to in turn control the operation of the switches in accordance with said columnar positions of the traveling carriage.

6. In a combined accounting machine and tape recording device, said accounting machine having a traveling carriage movable to various columnar positions and having a positionable differential actuator for each denominational order and positionable to represent various digital values, the combination of an element connected to and positionable in unison with each differential actuator; a plurality of projections on each element arranged in related pairs to correspond to various digital values; a plurality of switches for each denominational order corresponding to various digital values; a shiftable framework; a plurality of spring-loaded plungers, displaceably mounted in the framework and constructed and arranged to coact with the projections and the switches; means to yieldingly retain the plungers in displaced condition against the action of the spring load; means to position the differential actuators and the corresponding elements according to various digital values to locate the corresponding projections in engageable relationship with the corresponding plungers; means to shift the framework to cause the spring-loaded plungers corresponding to the effective projections to engage and be displaced by said projections against the spring load, and to cause said displaced plungers to operate the corresponding switches to transfer the digital values corresponding to the position of the differential actuators to the tape recording device; a plurality of control switches to control the entering of data in the tape recording device; a second shiftable framework; a spring-loaded operating plunger for each control switch, said plungers displaceably mounted in the second framework; means to yieldingly retain the control switch plungers in displaced condition against the spring load; a programming device mounted on the traveling carriage and comprising a control switch operating projection for each preselected columnar position of said traveling carriage, said projections arranged to be located in coacting relationship with the corresponding plungers, as the traveling carriage moves to said preselected columnar positions; and means to connect the second framework with the shifting means to cause the effective projection to engage and displace the corresponding plunger against the spring load to in turn cause the displaced plunger to operate the corresponding control switch to control the entering of data in the tape recording device, in accordance with the columnar position of the traveling carriage.

7. In a combined accounting machine and tape recording device, said accounting machine having a traveling carriage, movable to various columnar positions and having a differential actuator for each denominational order, said actuators being positionable according to various digital values, the combination of a main control switch to render the tape recording device operative; means to actuate the main control switch to control the operation of the tape recording device; a plurality of switches for each denominational order, said switches corresponding to various digital values; a first shiftable framework; a spring-loaded operating plunger for each switch, said plungers mounted in the framework so as to be displaceable against the action of the spring load; means to retain the plungers in displaced condition; an element operatively connected to and positioned by each differential actuator; a plurality of projections on each element corresponding to the various digital values; means to shift the framework to cause the plungers to sense for and be displaced by the projections in accordance with the positioning of the differential actuators and the elements, and to cause the displaced plungers, while held by their retaining means, to operate the corresponding switches to transmit the digital values corresponding to the positioning of the actuators and the elements to the tape recording device; a plurality of program control switches to control the entering of data in the tape recording device; a second shiftable framework; a spring-loaded operating plunger for each program switch, said plungers displaceably mounted in the second framework; means to yieldingly retain the program switch plungers in displaced condition against the spring load; a program switch operating device mounted on the traveling carriage and comprising a program switch operating projection for each preselected columnar position of said traveling carriage, said projections arranged to be located in coacting relationship with the corresponding plungers, as the traveling carriage moves to said preselected columnar positions; means to connect the second framework to the shifting means for the first framework to cause the program switch plungers to sense for and be displaced by the corresponding program projections and to cause the displaced program plungers, while held by their retaining means, to operate the corresponding program switches to render the tape recording device operative to receive data from the accounting machine; common operating means for the shifting means and for the main control switch actuating means; means including a clutch device to connect the operating means to the shifting means and to the control switch actuating means; and means controlled by the traveling carriage in preselected columnar positions to control the effectiveness of the clutch device to in turn control the operation of the tape recording device, to control the operation of the digital switches, and to control the operation of the program switches, in accordance with the columnar position of said traveling carriage.

References Cited in the file of this patent

UNITED STATES PATENTS

| | | |
|---|---|---|
| 1,292,537 | Thieme | Jan. 28, 1919 |
| 1,834,561 | Watson | Dec. 1, 1931 |
| 1,864,714 | Davis | June 28, 1932 |
| 2,134,284 | Keefe | Oct. 25, 1938 |
| 2,229,905 | Sundstrand | Jan. 28, 1941 |
| 2,332,755 | Robertson et al. | Oct. 26, 1943 |
| 2,516,013 | Mixer | July 18, 1950 |
| 2,625,324 | Sundstrand | Jan. 13, 1953 |
| 2,652,196 | Sterling | Sept. 15, 1953 |
| 2,668,659 | Swanson | Feb. 9, 1954 |
| 2,812,902 | Runde et al. | Nov. 12, 1957 |
| 2,861,739 | Chall et al. | Nov. 25, 1958 |